United States Patent
Lo et al.

(10) Patent No.: US 11,061,688 B2
(45) Date of Patent: Jul. 13, 2021

(54) COMPUTER RESOURCE MANAGEMENT BASED ON PRIORITIZATION OF COMPUTER EXECUTABLE EVENTS

(71) Applicant: DraftKings, Inc., Boston, MA (US)

(72) Inventors: Frank Lo, Boston, MA (US); Brandon Joseph Ward, Brookline, MA (US); Alexander John Krusz, Cambridge, MA (US); Brendan Thompson Grove, Brookline, MA (US)

(73) Assignee: DraftKings, Inc., Boston, MA (US)

( * ) Notice: Subject to any disclaimer, the term of this patent is extended or adjusted under 35 U.S.C. 154(b) by 0 days.

(21) Appl. No.: 16/771,897

(22) PCT Filed: Dec. 11, 2018

(86) PCT No.: PCT/US2018/064957
§ 371 (c)(1),
(2) Date: Jun. 11, 2020

(87) PCT Pub. No.: WO2019/118465
PCT Pub. Date: Jun. 20, 2019

(65) Prior Publication Data
US 2020/0379776 A1    Dec. 3, 2020

Related U.S. Application Data

(60) Provisional application No. 62/597,637, filed on Dec. 12, 2017, provisional application No. 62/597,643, filed on Dec. 12, 2017.

(51) Int. Cl.
*G06F 9/44*    (2018.01)
*G06F 40/106*   (2020.01)
(Continued)

(52) U.S. Cl.
CPC ............. *G06F 9/44* (2013.01); *G06F 40/106* (2020.01); *G06N 5/02* (2013.01); *G06F 15/16* (2013.01);
(Continued)

(58) Field of Classification Search
CPC ........ G06F 9/44; G06F 6010/02; G06F 15/16; G06F 40/106; G06F 17/30;
(Continued)

(56) References Cited

U.S. PATENT DOCUMENTS

2002/0115488 A1    8/2002   Berry et al.
2008/0146342 A1    6/2008   Harvey et al.
(Continued)

OTHER PUBLICATIONS

International Search Report and Written Opinion for PCT/US2018/064957, dated Apr. 18, 2019.
(Continued)

*Primary Examiner* — Quoc A Tran
(74) *Attorney, Agent, or Firm* — Foley & Lardner LLP

(57) ABSTRACT

Systems and methods directed to managing computer resource allocation by monitoring signals indicating demand for services utilizing computer resources are described. A method includes maintaining, for each first event of first events, historical registration data and respective parameter values of the first event and identifying, for a second event having an open registration status, respective parameter values of the second event, and registration data for the second event. The method includes computing a similarity score between the second event and each first event of the plurality of first events, based on the respective parameter values of the first event and the second event and the registration data of the second event and the historical registration data of the first event, generating, for the second
(Continued)

event, a projected number of entities based on determined information and determining a ranking of the second event.

20 Claims, 21 Drawing Sheets

(51) Int. Cl.
  *G06N 5/02*   (2006.01)
  *G06Q 20/08*  (2012.01)
  *G06Q 50/34*  (2012.01)
  *G07F 17/32*  (2006.01)
  *H04L 29/06*  (2006.01)
  *G06F 15/16*  (2006.01)
  *G06Q 10/02*  (2012.01)
  *G06F 17/00*  (2019.01)

(52) U.S. Cl.
  CPC ........... *G06Q 10/02* (2013.01); *G06Q 20/085* (2013.01); *G06Q 50/34* (2013.01); *G07F 17/3237* (2013.01); *G07F 17/3288* (2013.01); *H04L 63/102* (2013.01)

(58) Field of Classification Search
  CPC .. G07F 17/3288; G06Q 20/085; G06Q 10/02; G06Q 10/06; G06N 5/02; H04L 63/102
  See application file for complete search history.

(56) References Cited

U.S. PATENT DOCUMENTS

| | | |
|---|---|---|
| 2012/0041767 A1 | 2/2012 | Hoffman et al. |
| 2012/0289323 A1 | 11/2012 | Whitmire |
| 2016/0110669 A1* | 4/2016 | Iyer .................. G06Q 10/06315 |
| | | 705/7.25 |
| 2016/0328919 A1 | 11/2016 | Marantelli |
| 2017/0180949 A1* | 6/2017 | Nishimura ............ H04W 76/50 |
| 2017/0310605 A1* | 10/2017 | Garcia .................... H04L 47/76 |
| 2018/0129503 A1* | 5/2018 | Narayan ............ H03K 19/0175 |

OTHER PUBLICATIONS

Examination Report for AU Appl. No. 2018386004, dated Jun. 30, 2020.
International Preliminary Report on Patentability for International Appl. No. PCT/US2018/064957, dated Jun. 25, 2020.

* cited by examiner

Lobby 202

| Sport | Event | Style | Entry Fee | Total Prizes | Registrants | Live |
|---|---|---|---|---|---|---|
| Football | E1 | Classic | $5 | G$500,000 | 235K/118.9K | 00:22 |
| Football | E2 | Classic | $22 | G$200,000 | 22/7067 | 00:22 |
| Basketball | E3 | Pick'Em | $22 | G$250,000 | 143/14.7K | 01:01 |
| Football | E4 | Classic | $25 | G$7,000 | 6/302 | 00:45 |
| Football | E5 | Classic | $33 | G$125,000 | 24/5322 | 01:01 |
| Basketball | E6 | Classic | $8 | G$200,000 | 52/16.6K | 01:21 |
| Football | E7 | Pick'Em | $25 | G$8,000 | 3/295 | 00:45 |

Lobby 202

| Sport | Event | Style | Entry Fee | Total Prizes | Registrants | Live |
|---|---|---|---|---|---|---|
| Football | E1 | Classic | $5 | G$500,000 | 965K/118.9K | 00:22 |
| Football | E2 | Classic | $22 | G$200,000 | 5024/7067 | 00:22 |
| Basketball | E3 | Pick'Em | $22 | G$250,000 | 11.2K/14.7K | 01:01 |
| Football | E4 | Classic | $25 | G$7,000 | 255/302 | 00:45 |

User History 902

| Sport | Event | Style | Entry Fee |
|---|---|---|---|
| Baseball | E1' | Classic | $10 |
| Football | E2' | Classic | $10 |
| Football | E3' | Pick'Em | $2 |
| .... | .... | .... | .... |

FIG. 9A

Active Events 904

| Sport | Event | Style | Entry Fee | Similar | Similarity Rank |
|---|---|---|---|---|---|
| Hockey | E1 | Pick'Em | $2 | No | N/A |
| Football | E2 | Classic | $10 | Yes | 1/10 |
| Basketball | E3 | Classic | $2 | Yes | 5/10 |
| .... | .... | .... | .... | .... | .... |

Similar event 906

FIG. 9B

Reference table 1102

| User | Sport | Style | Entry Fee | Day |
|---|---|---|---|---|
| User 1 | NFL | Classic | Medium | Sunday |
| User 2 | NBA | Classic | Large | Saturday |
| User 3 | NFL | Pick'Em | Medium | Sunday |
| User 4 | NHL | Classic | Small | Friday |
| User 5 | NFL | Classic | Medium | ??? |

FIG. 11

COMPUTER RESOURCE MANAGEMENT BASED ON PRIORITIZATION OF COMPUTER EXECUTABLE EVENTS

CROSS-REFERENCE TO RELATED APPLICATIONS

This application is a U.S. National Phase Application under 35 U.S.C. § 371 of International Application No. PCT/US2018/064957, filed on Dec. 11, 2018, which claims the benefit of and priority to U.S. Provisional Application 62/597,637, filed on Dec. 12, 2017, and to U.S. Provisional Application 62/597,643, filed on Dec. 12, 2017. The entire disclosure of each are incorporated herein by reference in their entirety.

BACKGROUND OF THE DISCLOSURE

Event management systems allocate computer resources to maintain and update events. There is a computer-resource cost associated with each maintained event. One or more client devices may view one or more available event, and accounts respectively associated with the client devices may register to participate in one or more of the event. When a large number of event are generated and presented for registration, the client devices may register across the event in a dispersed manner, with each event having a small number of registered client devices. This large number of events may require a large amount of computer resources to maintain and update.

BRIEF SUMMARY OF THE DISCLOSURE

Systems and methods of the present solution are directed to managing computer resource allocation by monitoring signals indicating demand for services utilizing the computer resources. In some embodiments, a computing system can monitor the demand for one or more services provided by the computing system and based on a current and projected demand for the services, manage the allocation of computer resources to optimize for demand. Stated in another way, a computing system described herein can be configured to increase the number of computer resources allocated to a service when a projected demand for the service is determined to exceed a current capacity of the service offered by the computing system.

In addition, in some embodiments, a computing system that is configured to a plurality of services may be configured to determine a projected demand for each of the plurality of services and based on the projected demand of the plurality of services, steer traffic to the subset of services that have a projected demand below a desired threshold.

According to one embodiment, the present disclosure relates to managing the generation of events based on predicting a number of entities of other events. For example, an event generating system may generate new events based on a registration pacing of events that are currently open for registration. In this manner, the event generating system can avoid or can delay generating new events and thus avoid the entity dispersion issues discussed herein. Rather than maintaining a large number of events with few entities, which requires a significant use of resources, the event generating system can help to ensure that fewer events with more entities are generated, thus improving the efficiency of the allocation of computer resources. For example, computer resources can be managed by prioritizing which events to open and maintain based in part on dynamically changing entity data.

According to one aspect, methods and systems for improving computer resource allocation by prioritization of computer executable events based on dynamically changing entity data. The method includes maintaining, by an event management system including one or more processors, for each first event of a plurality of first events managed by the event management system, historical registration data. The historical registration data identifies, for each time of a plurality of times, a number of entities at the time. Each first event has respective parameter values of one or more parameters used to generate the first event. The method further includes identifying, by the event management system, for a second event that has an open registration status, respective parameter values of one or more parameters used to generate the second event, and registration data identifying, for each time of a plurality of times since registration for the second event was opened, a current number of entities at the time. The method further includes computing, by the event management system, a similarity score between the second event and each first event of the plurality of first events, the similarity score computed using i) the respective parameter values used to generate the second event and generate the first event and ii) the registration data of the second event and the historical registration data of the first event. The method further includes selecting, by the event management system, for the second event, a subset of the plurality of first events based on the similarity score exceeding a threshold similarity score value, and generating, by the event management system, for the second event, a projected number of entities based on i) the registration data of the second event and ii) the historical registration data of one or more first events included in the selected subset. The method further includes determining a ranking of the second event relative to one or more third events that have an open registration status. The method further includes determining, by the event management system, a layout for an event display based on the determined ranking and transmitting, by the event management system, the event display data including the layout.

According to another aspect, a method for ranking events based on predicting a number of entities for the events includes maintaining, by an event management system including one or more processors, for a user, an event history identifying events in which the user has participated, and identifying, by the event management system, for the user, one or more similar users from a plurality of users based on determining similarities between events in which the user has participated and events in which similar users have participated and the user did not participate. The method further includes determining, by the event management system, for the user, a user event profile including properties or weights for respective values of a plurality of parameters used to generate events in which the user or similar users have participated, the properties or weights assigned based on values of parameters used to generate the events in which the user has participated and values of parameters used to generate events in which similar users have participated and the user did not participate. The method further includes identifying, by the event management system, a plurality of candidate events for the user to participate in based on the user event profile, identifying, by the event management system, for each candidate event of the plurality of candidate events, respective values of parameters used to generate the candidate event, and determining, by the event management system, for each candidate event—user event profile pair, an event matching score indicating a likelihood that the user will participate in the candidate event, the score determined by applying properties or weights to the respective values of parameters used to generate the candidate event based on the properties or weights of the user event profile. The method further includes assigning, by the event management system, a rank to each candidate event of the plurality of candidate events based on the event matching score of the respective candidate event—user event profile pair, selecting, by the event management system, a candidate event of the plurality of candidate events based on the assigned rank of the candidate event, and providing, by the event management system, to the device of the user, a content item identifying the selected candidate event.

According to another aspect, a system for prioritization of computer executable events based on dynamically changing entity data is described herein. The system includes a processor and a memory. The memory includes historical registration data for each first event of a plurality of first events, the historical registration data identifying, for each time of a plurality of times, a number of entities at the time, each first event including respective parameter values of one or more parameters used to generate the first event, and computer-readable instructions stored in the memory. The computer-readable instructions, when executed by the processor, cause the processor to identify, for a second event that has an open registration status, respective parameter values of one or more parameters used to generate the second event and registration data identifying, for each time of a plurality of times since registration for the second event was opened, a current number of entities at the time, compute, a similarity score between the second event and each first event of the plurality of first events, the similarity score computed using i) the identified respective parameter values used to generate the second event and generate the first event and ii) the identified registration data of the second event and the historical registration data of the first event, select, for the second event, a subset of the plurality of first events based on the similarity score for each of the events of the subset exceeding a threshold similarity score value, generate, for the second event, a projected number of entities based on i) the registration data of the second event and ii) the historical registration data of one or more first events included in the selected subset, and determine a ranking of the second event relative to one or more third events that have an open registration status. The computer-readable instructions, when executed by the processor, cause the processor to determine a layout for an event display based on the determined ranking and transmit the event display data including the layout.

In some embodiments, the computer-readable instructions, when executed by the processor, further cause the processor to determining, by the event management system, a layout for an event display based on the determined ranking and transmitting event display data including the layout. The computer-readable instructions, when executed by the processor, can further cause the processor to calculate, for each of the first events, a similarity score for each of one or more parameters common to the first event and the second event, and aggregating the similarity scores to generate a total similarity score for the first event and the second event. The computer-readable instructions, when executed by the processor, can further cause the processor to aggregate the similarity scores comprises performing a weighted sum using pre-determined properties or weights corresponding to the one or more parameters common to the first event and the second event.

In some embodiments, the computer-readable instructions, when executed by the processor, can further cause the processor to generate, for the second event, a projected number of entities comprises generating one or more entity profile parameters for the second event. The computer-readable instructions, when executed by the processor, can further cause the processor to generate the one or more entity profile parameters for the second event comprises aggregating a corresponding respective parameter value for the first events using pre-determined properties or weights. The computer-readable instructions, when executed by the processor, can further cause the processor to identify, by the event management system, for the second event, respective parameter values for one or more entity profile parameters, wherein each of the first events includes respective parameter values for one or more entity profile parameters, and wherein the similarity score is computer further using the respective parameter values for the one or more entity profile parameters of the first events and the second event.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 9A depicts one or more embodiments of a user history;

FIG. 9B depicts one or more embodiments of an active events database;

FIG. 11 is a block diagram depicting one or more embodiments of a reference table for collaborative filtering;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for monitoring a pace of registrations of events for improved allocation of computer resources and for ranking events.

Section C describes embodiments of systems and methods for generating event recommendations to divert registrations across events.

A. Computing and Network Environment

Figure 1A:
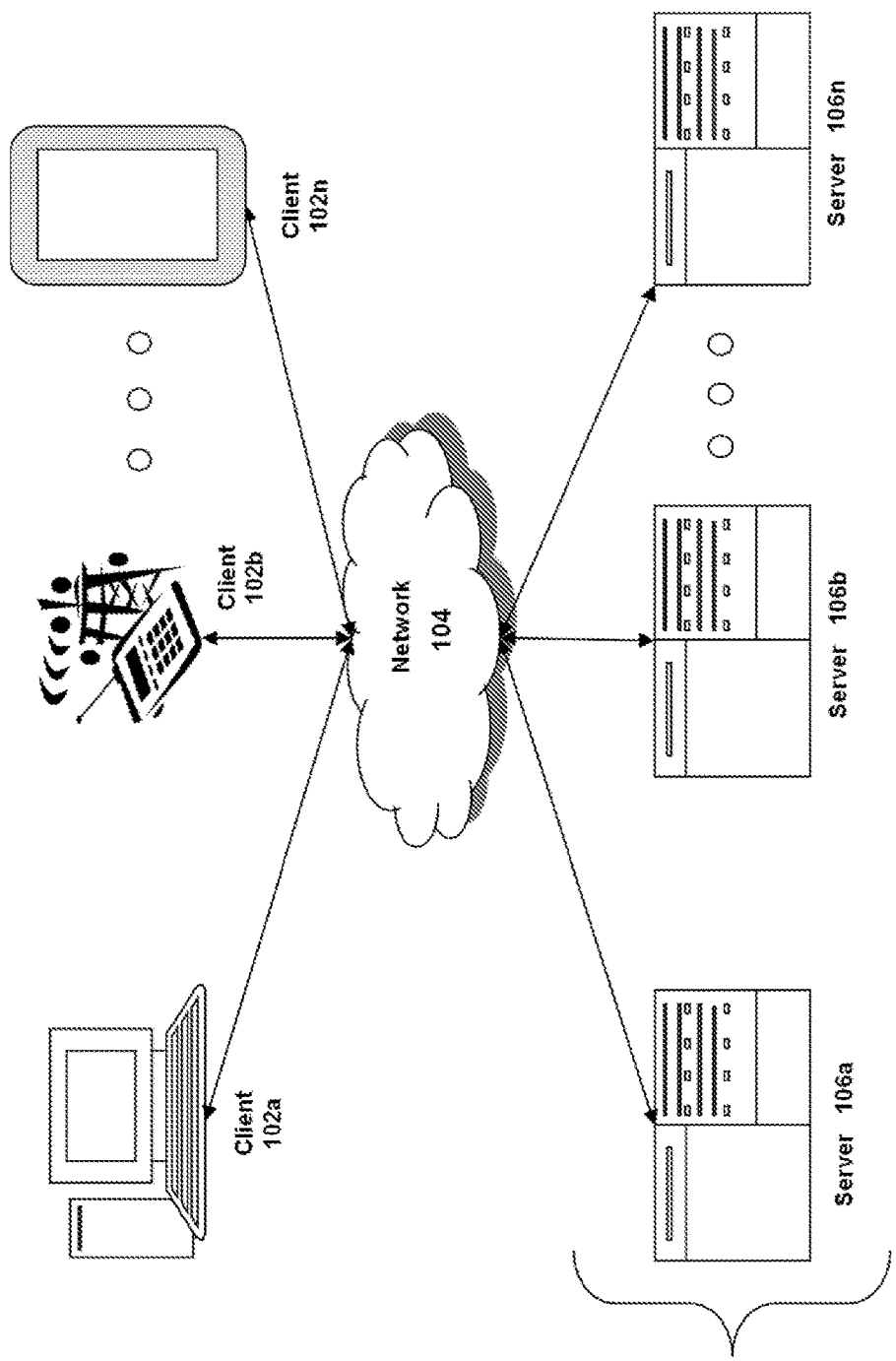
FIG. 1A is a block diagram depicting an embodiment of a network environment comprising client devices in communication with server devices via a network.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2050 (IMT-2050) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
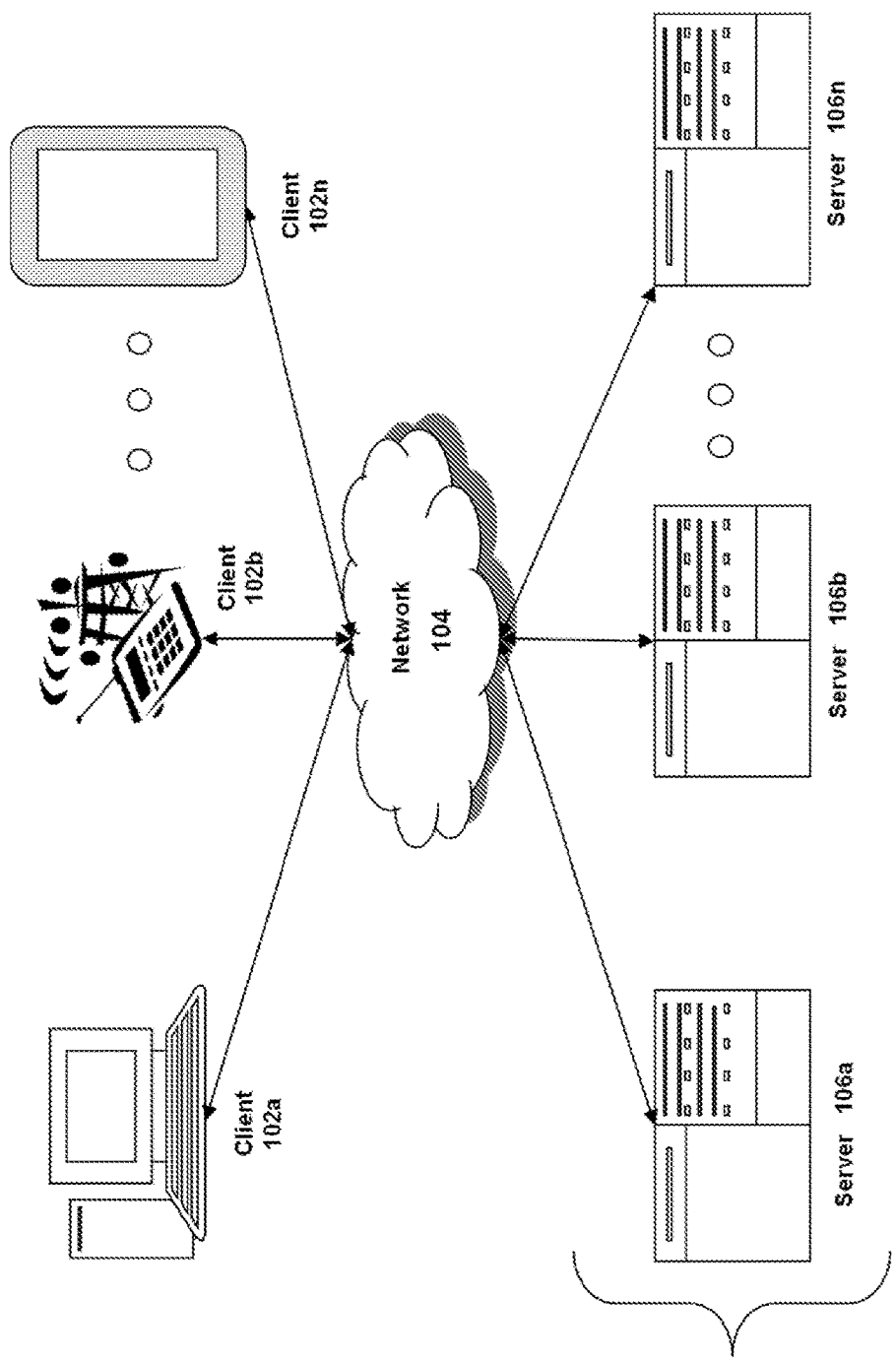
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EE2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
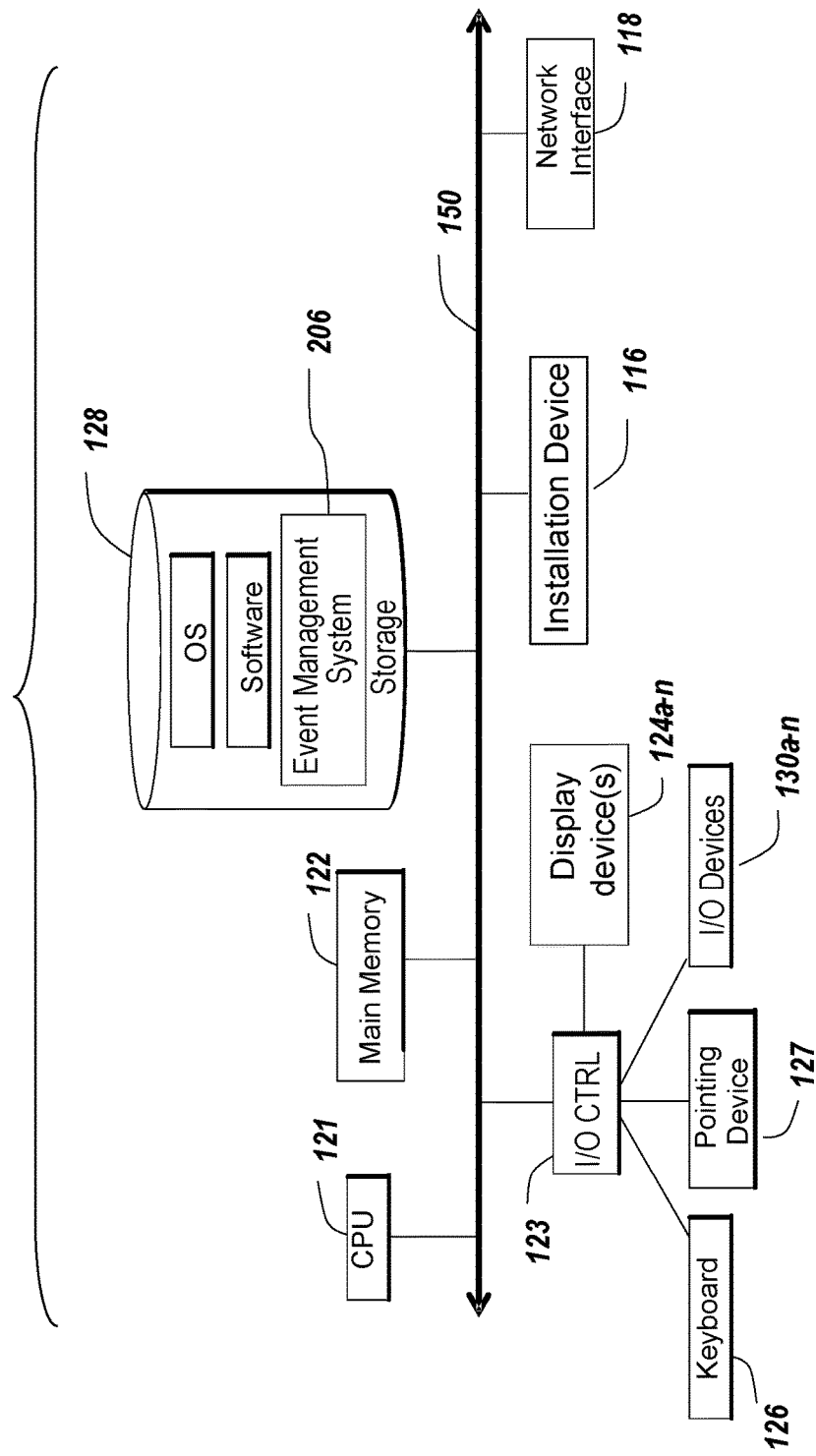
FIGS. 1C and 1D are block diagrams depicting embodiments of computing devices useful in connection with the methods and systems described herein.
Figure 1D:
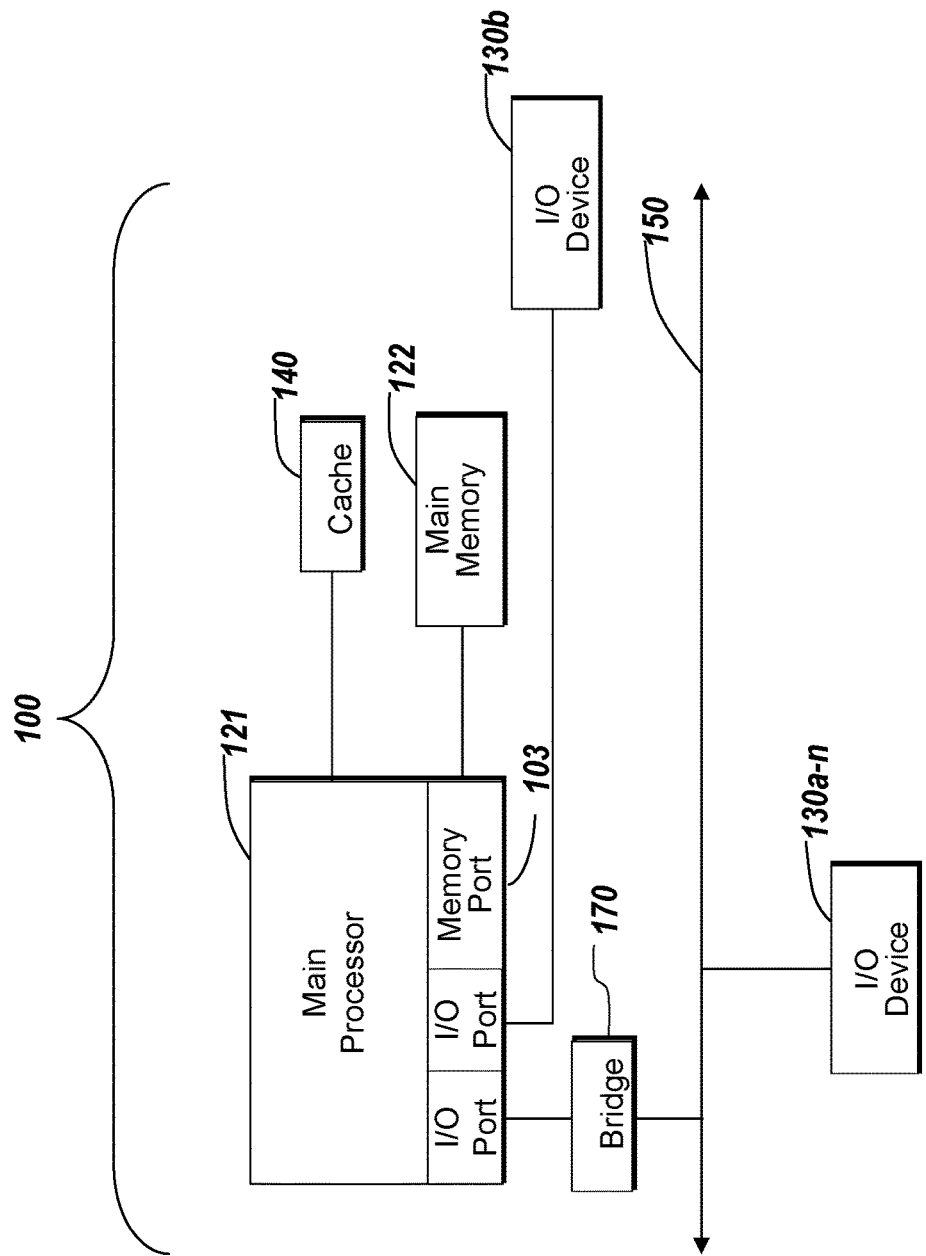

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of an event management system 206 (or event management system). As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software for the event management system 206. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage devices 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2050, WINDOWS Server 2022, WINDOWS CE, WINDOWS Phone, WINDOWS XP, WINDOWS VISTA, and WINDOWS 7, WINDOWS RT, WINDOWS 8, and WINDOWS 10, all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Monitoring a Pace of Registrations of Events for Improved Allocation Of Computer Resources As discussed above, systems and methods of the present solution are directed to generating events to improve computer resource allocation. An event generating system can avoid or can delay generating new events and thus avoid registrant dispersion issues, and can help to ensure that fewer events with more registrants are generated, thus conserving and better allocating computer resources.

According to one aspect, a method for generating events includes maintaining, by an event management system including one or more processors, for each first event of a plurality of first events managed by the event management system, historical registration data. The historical registration data identifies, for each time of a plurality of times during which registration of the first event was open, a number of registrants at the time. Each first event has respective parameter values of one or more parameters used to generate the first event. The method further includes identifying, by the event management system, for a second event that has an open registration status, respective parameter values of one or more parameters used to generate the second event, and registration data identifying, for each time of a plurality of times that has lapsed since registration for the second event was opened, a current number of registrants at the time. The method further includes computing, by the event management system, a similarity score between the second event and each first event of the plurality of first events. The similarity score can be computed using i) the respective parameter values used to generate the second event and generate the first event and ii) the registration data of the second event and the historical registration data of the first event. The method further includes selecting, by the event management system, for the second event, a subset of the plurality of first events based on the similarity score exceeding a threshold similarity score value. The method further includes generating, by the event management system, for the second event, a projected number of registrants based on i) a current number of registrants of the second event and ii) the historical registration data of one or more first events included in the selected subset. The method further includes determining, by the event management system, a time at which to generate a fourth event based on the projected number of registrants, and generating, by the event management system, the fourth event at the determined time.

Figure 2A:
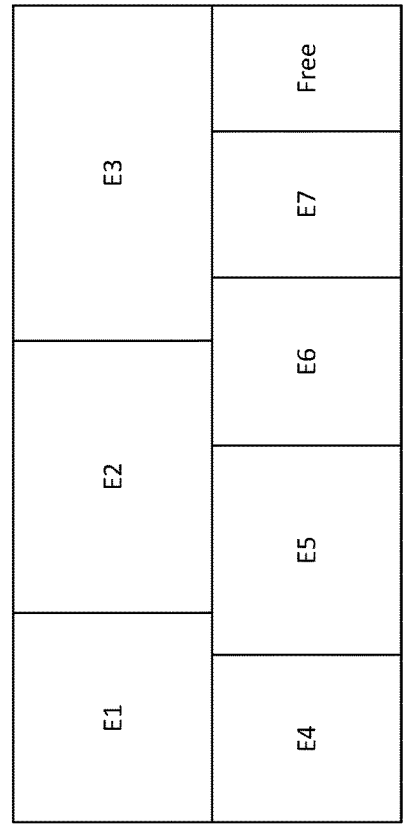
FIG. 2A depicts an event lobby showing events and a corresponding allocation of computer resources.

Referring now to FIG. 2A, a representation of a queue or list of events 202 including events E1 through E7 is shown. The queue or list of events can be referred to herein as a lobby. Events as used herein may also refer to any object or data structure representing an event. In some embodiments, an event can be any event for which one or more client devices can register for. For instance, the event can be a class at a predetermined time, a contest, a queue, among others. Data or computer resources to allow a client device to render or otherwise present the list of events 202 may be transmitted to the client device by the event management system 206. The list of events 202 shows seven events that are open for registration on a first page or first screen, but more events (including one or more that are open for registration) can be maintained by the event management system 206 and may be displayable responsive to the client device transmitting a request for more events to the event management system 206.

The list of events 202 may show, for one or more of the events E1 through E7 (e.g. for each event), a sport category, an event name or identifier, an event style, an entry fee, a total prize pool for the event, a total number of entries and a maximum registrant cap (which may be a dynamic cap that increases or decreases over time, or increases or decreases based on other factors such as current registrant data and/or projected registrant data), and a time corresponding to a registration deadline (e.g. a countdown to the event going "live," or a time of the registration deadline). Other information (e.g. event relevant information) may be displayed in place of, or in addition to, any of the information shown in FIG. 2A, and any of the information shown in FIG. 2A may be omitted as appropriate. As can be seen in FIG. 2A, the events E1 through E7 do not have many registrants relative to their registrant cap. The registrants are dispersed over the seven events, even though each event has significant capacity to include or register more registrants such that all registrants could be accommodated with a smaller number of event. It should be appreciated that although the events relate to sports categories, the events can be educational classes that users can sign up for or register in. The events can also be any other event, for instance, a roll-out of a new software update.

A block figure showing computer resource allocation 204 is also shown in FIG. 2A. In some embodiments, the computer resource allocation 204 can represent the total resources the system has allocated to hosting events. As shown in FIG. 2A, each of the events E1-E7 utilize or consume certain amounts of computer resources, which are indicated by the respective blocks shown in FIG. 2A. The computer resource allocation 204 corresponds to resources allocated by the event management system 206 to maintain and/or update the events E1 through E7 (e.g. processing power, processing time, time on a cloud or otherwise remote computing system, or other computer resources). As can be seen in FIG. 2A, a "free" or available amount of computer resources is small relative to the resources required to maintain or update all seven events. As such, if the event management system 206 needs to create or generate additional events, the event management system 206 may not have sufficient computer resources to do so until additional computer resources are made available to the event management system or events utilizing existing computer resources are terminated and free up the computer resources they were consuming.

Figure 2B:
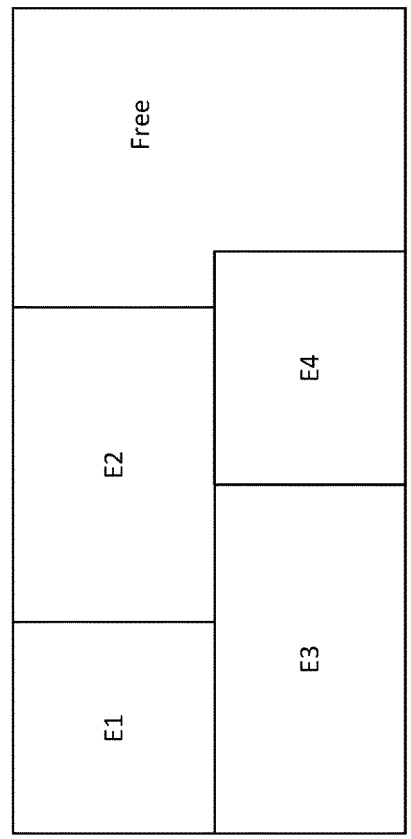
FIG. 2B depicts an event lobby showing events and a corresponding allocation of computer resources.

FIG. 2B shows a list of events 202 that includes events E1 through E4. Events for the list of events 202 shown in FIG. 2B are generated by an event ranking system 302 (which can be included in the event management system 206) as described herein. As can be seen in FIG. 2B, fewer events are open for registration and as a result fewer computer resources are being utilized allowing the event management system 206 sufficient computer resources to generate new events. In addition to utilizing fewer computer resources, the total number of registrants in each event, and the number of registrants as a percentage of the registrant cap of each event, is increased as compared to the example shown in FIG. 2A. The increased number of registrations represents better computer resource utilization per registrant, enabling the event management system to scale up without needing to increase the computer resources. As there is still room in each event E1 through E4, further registrants can still be accommodated.

As can be seen in the computer resource allocation 204 shown in FIG. 2B, resources need only be allocated for four events. Maintaining and updating each event may have a cost in terms of computer resources, and by lowering the total number events to be maintained or updated, computer resources can be preserved. The computer resource allocation 204 shown in FIG. 2B shows that there are more "free" computer resources than in the example shown in FIG. 2A, in which seven events E1 through E7 were generated.

Figure 3:
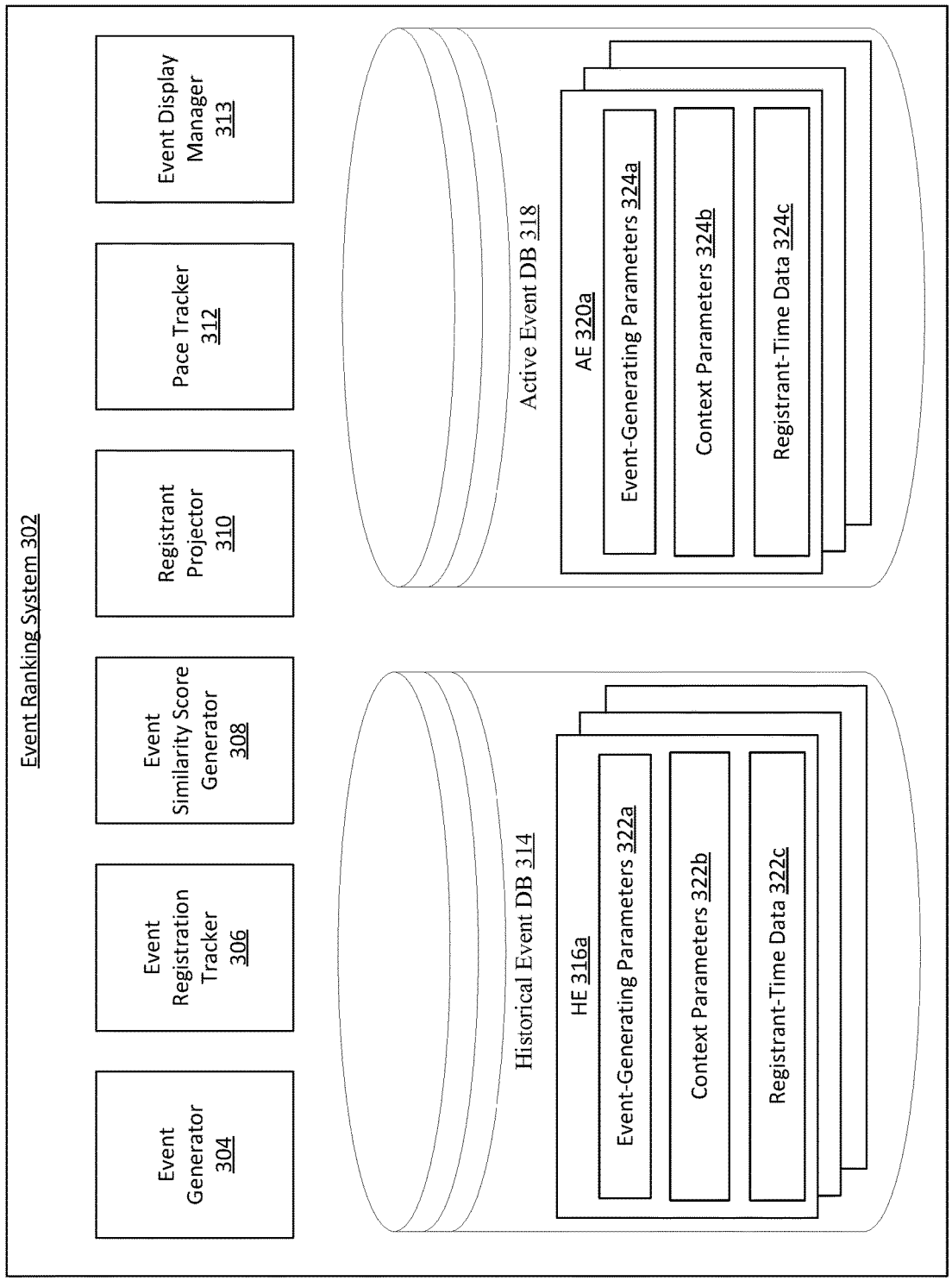
FIG. 3 is a block diagram depicting one or more embodiments of an event ranking system.

FIG. 3 is a block diagram showing an embodiment of an event ranking system 302 (or event ranking system). The event ranking system 302 can be included in the event management system 206 depicted in FIG. 1C. The event ranking system 302 can include or be executed on one or more servers, such as the servers 106 shown in FIG. 1A. The event ranking system 302 can include one or more applications, services, routines, servers, daemons, or other executable logics for generating an event, including one or more of an event generator 304 (or event generator), an event registration tracker 306 (or event registration tracker), an event similarity score generator 308 (or event similarity score generator), a registrant projector 310 (or entity projector), a pace tracker 312, and an event display manager 313 (or event display manager). The event ranking system 302 can also include, access, maintain or manage one or more data structures, including but not limited to a historical event database 314 (historical event DB 314), and an active event database 318 (active event DB 318).

The event generator 304 can include components, subsystems, modules, scripts, applications, or one or more sets of computer-executable instructions and can be configured to generate an event. The event generator 304 can be configured to generate an event (or event) by generating an event object based on one or more event-generating parameter values (e.g., event generating parameter values). The event-generating parameter values can include, for example, values for parameters including one or more of a league (e.g. NFL, MLB, NHL, NBA, a non-US league, or another sports organization), a game type (e.g. classic (with salary constraints) or pick'em (without salary constraints)), a registrant cap (e.g. a fixed cap, no cap, or a dynamic cap that changes based on demand or based on an instruction to change from another component, subsystem, module, script, or application of the event ranking system 302), one or more games, a registration close time (e.g. a particular date and time, such as the date and time of the start of a first game of the event), an entry fee, an eligibility specification requirement (e.g. a specification that only users having a certain experience level (e.g. as determined by a user profile) be permitted to enter the event), a prize type (e.g. a satellite (an event having a fixed number of entries to another event as at least part of a prize pool), a super-satellite (an event having a dynamic number of entries to another event as at least part of a prize pool (e.g. the dynamic number based on number of registrants), or a normal prize type (including monetary prizes as at least part of a prize pool). The event-generating parameter values can include any other appropriate parameter for generating an event.

The event generator 304 can be further configured to generate an event at a particular timing or according to a schedule or based on upcoming games. For example, the event generator 304 can be configured to generate one or more events corresponding to an upcoming game, or corresponding to a set of games played on one or more days (e.g. on a particular day or in a particular week). The event generator may be configured to generate an event when an active event hits its fixed registrant cap (has a number of registrants equal to a fixed registrant cap).

The event generator 304 can be further configured to deviate from a schedule, or to generate an event at a determined time, based on data received from another component, subsystem, module, script, or application of the event ranking system 302. For example, the event generator 304 can be configured to determine a time at which to generate an event based on a pacing determined by the pace tracker 312 (e.g. a pacing of one or more active events). The event generator 304 can be configured to deviate from a schedule (e.g. to delay generation of a scheduled event, or to restrict generation of a scheduled event) based on a pacing determined by the pace tracker 312. The event generator 304 can determine a timing for generating a new event based on pacing information for more than one event, and may weigh the pacing information based on features of the one or more events (e.g. based on respective total numbers of registrants for the events, and/or based on respective registrant caps for the events). For example, as is described in more detail below with reference to the pace tracker 312, the pace tracker 312 may determine that one or more active events are under-saturated (e.g. are below a projected or desired pace for the active event, or below a projected or desired number of registrants). The event generator 304 may be configured such that, based on or responsive to this determination, the event generator 304 restricts generation of a scheduled event.

The event generator 304 may determine a time at which to generate an event based on a policy for generating new event. The policy may include a schedule for generating new events including candidate times for generating a new event. The policy may include one or more rules for determining, at one of the candidate times for generating a new event, via the pace tracker 312 of the event ranking system 302, whether one or more events is under-saturated, and responsive to determining that the one or more events is under-saturated, restricting generating a new event at the one of the candidate times for generating a new event. This can result in conserving computer resources by restricting the event generator 304 from generating new events when a number of currently active events is determined to be sufficient to satisfy registrant needs.

The event registrant tracker 306 can include components, subsystems, modules, scripts, applications, or one or more sets of computer-executable instructions and can be configured to track registrants for one or more events. For example, the event registrant tracker 306 may track, for each of one or more events, how many users are registered for the respective active event at a plurality of times. The event registrant tracker 306 may maintain or reference a registrant profile that includes a plurality of time-registrant pairs for one or more events. A registrant-time pair may include a pair of associated data that indicates a time and a corresponding number of registrants. The event registrant tracker 306 may reference the active event DB 318 to track registrants for active events. The event registrant tracker 306 may also determine registrant profile parameter values (e.g., entity profile parameter values) related to characteristics of registrant profiles for events. Registrant profile data, for example, may be parametrized as registrant profile parameters (such as, for example, a maximum number of registrants, an integral of a number of registrants (e.g. between a first time and a second time), a number of registrants at a particular time (e.g. a time based on a time at which registration opened or a time based on a time at which registration closes), or parameters of a linear, exponential, or other function representing the registrant profile).

Figure 5:
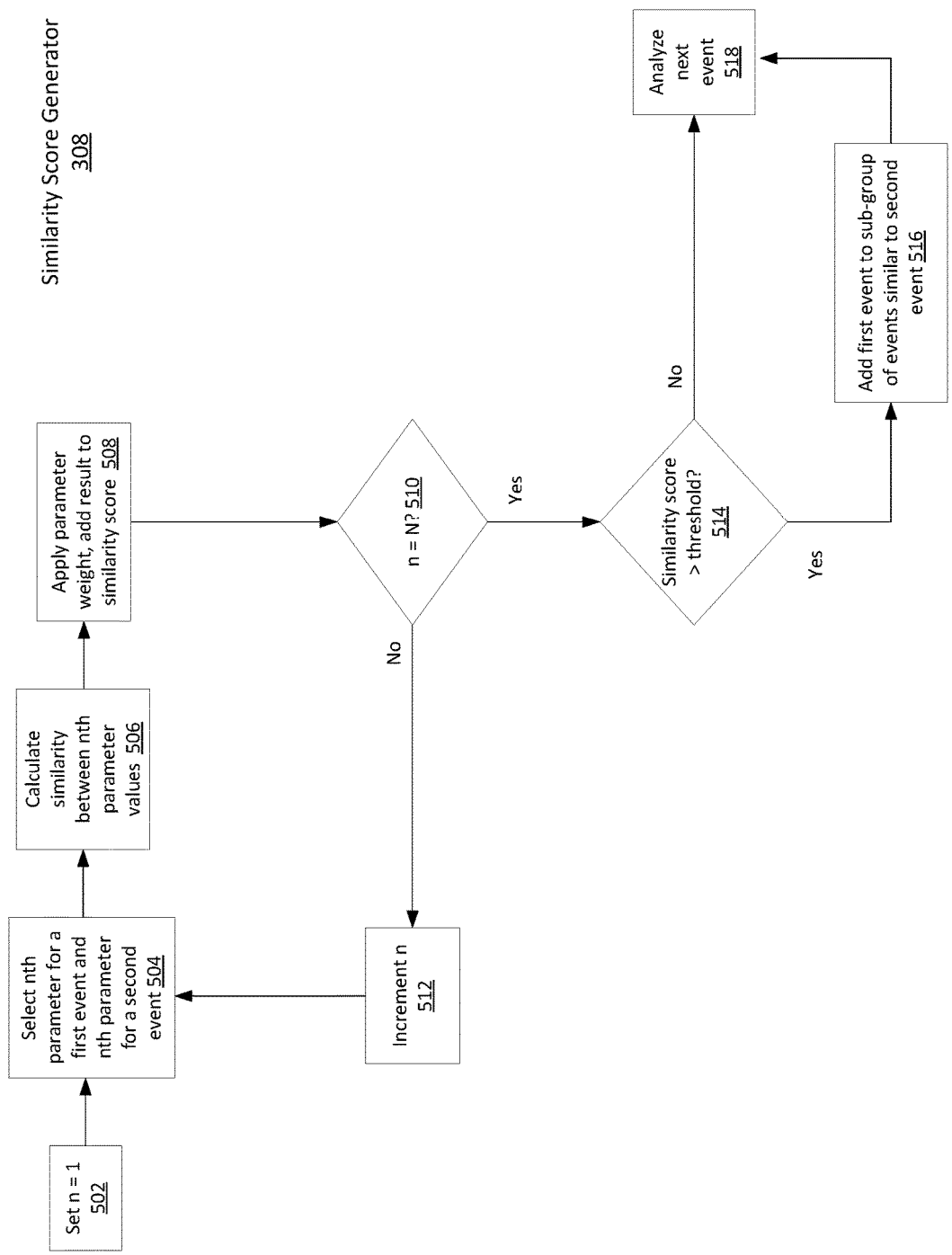
FIG. 5 is a flow chart depicting one or more embodiments of a process for determining one or more events that are similar to a target event.

The event similarity score generator 308 can include components, subsystems, modules, scripts, applications, or one or more sets of computer-executable instructions and can be configured to generate a similarity score for a pair of events, or a similarity score for a first event and a set of one or more second events. The event similarity score generator 308 can determine a similarity score between a first event and one or more second events based on respective parameter values for parameters of the events (e.g. event-generating parameters of the events and/or registrant profiles of the events). The event similarity score generator 308 can determine a similarity score based on determining a similarity between parameter values of parameters of the pair of events as described herein with respect to FIG. 5. The event similarity score generator 308 can determine the similarity score based on applying properties or weights (e.g., pre-determined properties, pre-determined weights) to the determined similarity between parameter values. The event similarity score generator 308 may determine a similarity score for each of a set of second events relative to a first event. The event similarity score generator 308 may generate a subset of events of the set of second events (for which, for example, each event of the subset of events has a similarity score above a threshold, or for which the subset of events includes a predetermined number of events having the highest similarity score of the set of second events). An example embodiment of the event similarity score generator 308 generating a similarity score for each of a set of second events relative to a first event is shown in FIG. 5.

Figure 6:
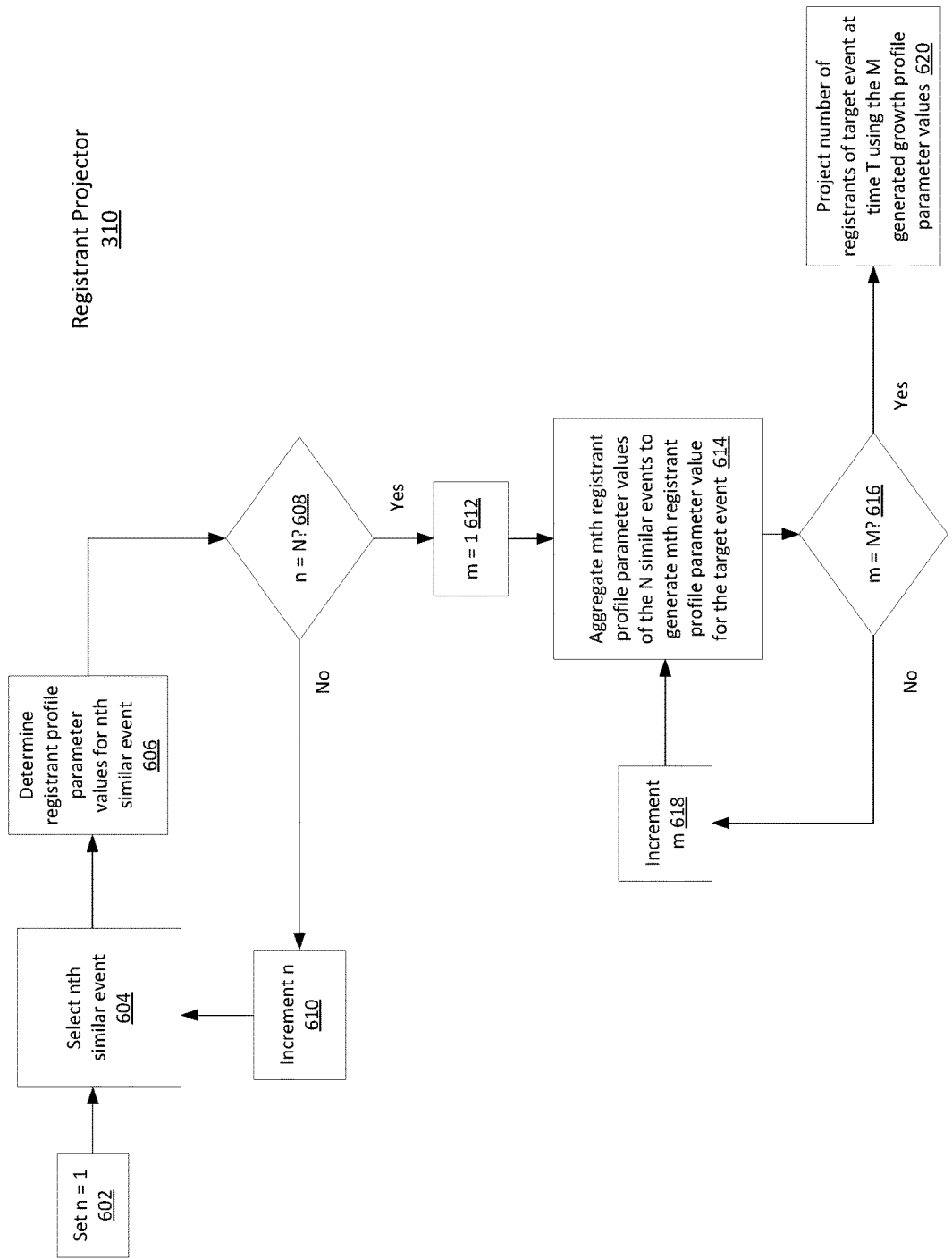
FIG. 6 is a flow chart depicting one or more embodiments of a process for projecting a number of registrants for a target event.

The registrant projector 310 can include components, subsystems, modules, scripts, applications, or one or more sets of computer-executable instructions and can be configured to generate a projection of a future number of registrants for an event. The registrant projector 310 can determine one or more registrant-profile parameters for an event. For example, the registrant projector 310 can determine one or more registrant-profile parameters for a target event based on registrant-profile parameters of events determined by the event similarity score generator 308 to be similar to the target event. The determined registrant-profile parameters for the target event can be used to project a number of registrants for the target event at a point in time between opening of registration and close of registration for the target event. An example of such projection by the registrant projector 310 is shown in FIG. 6, and is described in more detail below. The registrant-profile parameters may include parameters for a linear equation that is a function of time that outputs a projected number of registrants at a given time. A "projection profile" can be a set of such outputs across a span of time.

In other embodiments, the registrant projector 310 need not determine registrant-profile parameters for the target event. The registrant projector 310 can determine a projected number of registrants for the target event at a point in time relative to opening of registration or close of registration based on a number of registrants at a corresponding point in time for one or more similar events (e.g. determined to be similar by the event similarity score generator 308).

The pace tracker 312 can include components, subsystems, modules, scripts, applications, or one or more sets of computer-executable instructions and can be configured to track a pace of an event. The pace tracker 312 can determine a projected or desired number of registrants (e.g., entities) for a target event at a particular time (e.g. a particular time relative to opening of registration or close of registration). The projected or desired number of registrants can be determined based on registrant data (e.g., entity data) or a registrant profile (e.g., entity profile) for one or more events similar to the target event. The projected or desired number of registrants can be determined based on registrant-profile parameters determined for the target event by the registrant projector 310.

The pace tracker 312 can determine a difference between a number of registrants for the target event at a point in time (e.g. a current number of registrants, a current number of entities) and the projected or desired number of registrants for the point in time. In this manner, the pace tracker 312 can determine if the target event is below pace or above pace, and to what degree the target event is below pace or above pace. The event generator 304 can use this determination to determine a timing for generating a new event. For example, if the target event is below pace, the event generator 304 may delay or restrict generating a new event as described above. One or more embodiments of methods of using the pace tracker 312 are described herein with reference to FIG. 7A and FIG. 7B.

The pace tracker 312 can further rank events based on respective pace statuses. For example, the pace tracker 312 can determine, for each event of a plurality of events, to what degree the event is under-saturated or below pace (e.g. by how many participants the event is below pace, or by a percentage difference between an "on pace" number of participants (e.g. the projected or desired number of participants) and the projected pace, either at the current time or at a future time (e.g. at close of registration)). The pace tracker 312 can determine a rank for each of the plurality of events (or for a sub-set of the plurality of events having being under-saturated or below pace to a degree that is equal to or greater than a threshold) based on the pace statuses. The pace tracker 312 can determine a high rank for an events that is most under-saturated or below pace.

The event display manager 313 can include components, subsystems, modules, scripts, applications, or one or more sets of computer-executable instructions and can be configured to manage display of an event on a client device (such as a client 102). The event display manager 313 can provide data corresponding to a layout of an event display, such as a lobby 202 as shown in FIG. 2A.

The event display manager 313 can determine a layout of the event display that includes one or more predetermined locations for displaying events based on projections or rankings determined by the pace tracker 312. For example, the event display manager 313 can determine a layout that includes displaying, on a page or tab of the event display, only events that are below pace or that are below pace to a degree that is equal to or above a threshold, or displaying such below pace events in a predetermined location (e.g. in a prominent position in the list of events, such as at the top or start of a list of events), or can display such below-pace events according to one or more features, such as a stylistic feature (e.g. a particular text style (which can specify a size, a font, underlining, bold, italics, or another style, and in some embodiments the particular text style is different than another style used in the event display), a visual indicator associated with such below pace events (e.g. a box, circle, or other visual indicator that surrounds or is otherwise positioned relative to the below pace events), or any other appropriate feature.

The event display manager 313 can determine a layout that includes prominently displaying (e.g. on a front page or tab of the display, or high up in a list of events) events based on a display score or an event match score. The display score or match score may be determined by an event recommendation system, such as the event recommendation system 1002 described herein in reference to FIG. 10. The event recommendation system 1002 may determine the display score or match score based on the projections or the rankings determined by the pace tracker 312 (e.g. may include an under-saturation score as a sub-score for a total event match score). The event display manager 313 may use rankings determined by the event recommendation system 1002 to determine the layout for the event display. Thus, an event that is determined to be below pace may be displayed more prominently than would otherwise be the case.

The historical event DB 314 can include one or more data structures that store one or more historical events 316. A historical event 316 can be an event for which registration is closed. For example, the historical event DB 314 can store a historical event 316a, 316b, 316c, or more historical events. The historical event 316a can include data 322, including event-generating parameters 322a, context parameters 322b, and registrant-time data 322c. Each of the historical events stored in the historical event DB 314 can include event-generating parameters, context parameters, and registrant-time data. The historical event DB 314 is described in more detail below with respect to FIG. 4A.

The active event DB 318 can include one or more data structures that store one or more active events 320. An active event 320 can be an event for which registration is open, or an event for which registration has not yet opened. For example, the active event DB 318 can store an active event 320a, 320b, 320c, or more active events. The active event 320a can include data 324, including event-generating parameters 324a, context parameters 324b, and registrant-time data 324c. Each of the active events stored in the active event DB 318 can include event-generating parameters, context parameters, and registrant-time data. The active event DB 318 is described in more detail below with respect to FIG. 4B.

Figure 4A:
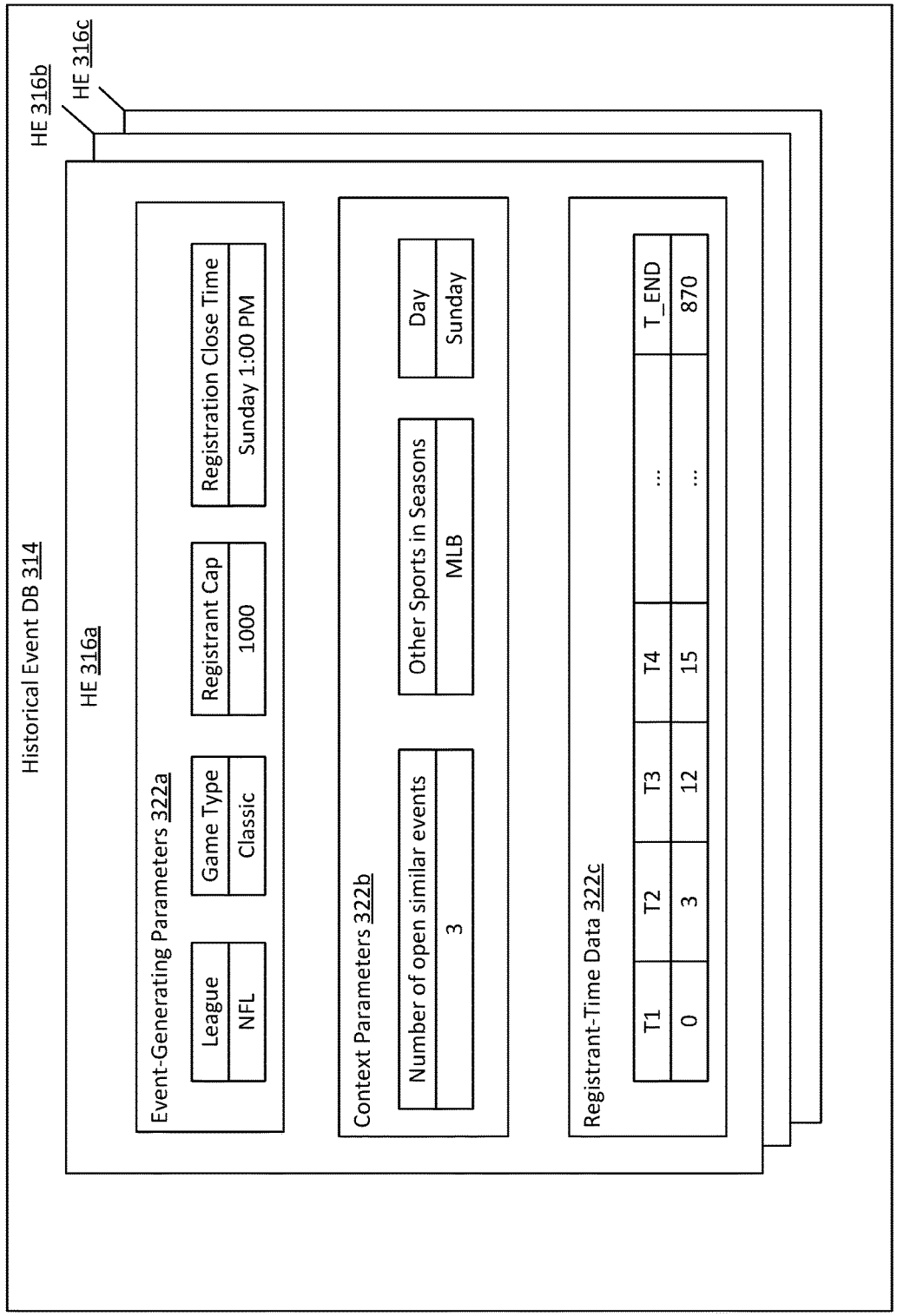
FIG. 4A is a block diagram depicting one or more embodiments of a historical event database.

Referring now to FIG. 4A, FIG. 4A shows a historical event DB 314 including a historical event 316a, a historical event 316b, and a historical event 316c. The historical event 316a includes data 322 including event-generating parameters 322a, context parameters 322b, and registrant-time data 322c. The event-generating parameters can be, or can be based on, any parameters used (e.g. by the event generator 304) to generate the historical event 316a. As described above, the event-generating parameters can include, for example, one or more of a league, a game type, a registrant cap, one or more games, a registration close time, an entry fee, an eligibility specification requirement, a prize type, or any other parameters used for generating an event.

The context parameters relate to a context for the historical event 316a. The context can include, for example, whether sports other than the sport of the historical event 316a were in season during the registration period of the historical event 316a. If other sports were in session, the number of registrants for the historical event 316a may have been depressed, and using a context parameter related to this to account for such information (e.g. by the registrant projector 310) would be useful. Another context parameter may indicate, for example, a day of the week on which registration for the historical event 316a closed, or whether registration for the historical event 316a closed on a weekend or on a weekday.

The context parameters can also relate to information related to other events, such as a number of events running concurrently with, or in close temporal proximity to (e.g. within one hour of, within 2 hours of, within 5 hours of, within one day of, within two days of, or within a week of) the historical event 316a. Running concurrently with, or in close temporal proximity to, the historical event 316a can refer to events that have an overlapping registration period, or that have registration periods that are separated by a small amount of time (such as one hour, 2 hours, 5 hours, one day, two days, or one week). For example, such context parameters can include an average number of concurrent active events during the registration period of the historical event 316a, or an average number of concurrent active events during a time period of interest within the registration period of the historical event 316a (e.g. within the last hour of registration of the historical event 316a, or at close of registration). These averages may be averages of events determined to be similar to the historical event 316a by the event similarity score generator 308. Another context parameter may be an indicator of a number of registrants of events running concurrently with, or in close temporal proximity to, the historical event 316a.

The historical event 316a further includes registrant-time data 324c. The registrant-time data 324c can include time—number-of-registrant pairs (pairs of associated data) indicating a number of registrants at a plurality of times T1 through TEND. T1 may correspond to a time at which registration of the historical event 316a opened, and time TEND may correspond to a time at which registration of the historical event 316a closed. The registrant-time data 324c may also include registrant profile parameters for the historical event 316a.

Figure 4B:
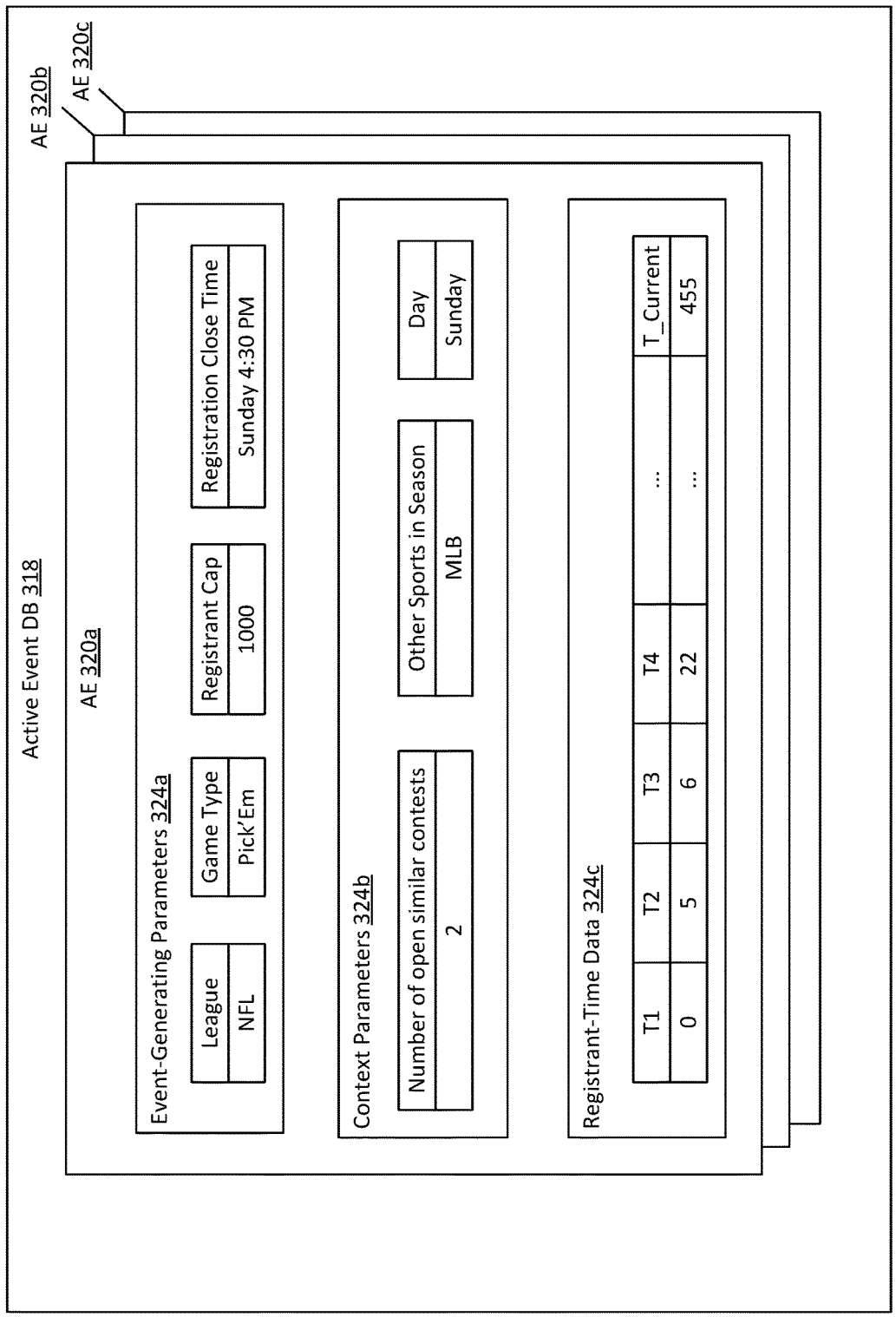
FIG. 4B is a block diagram depicting one or more embodiments of an active event database.

Referring now to FIG. 4B, FIG. 4B shows an active event DB 318 including an active event 320a, an active event 320b, and an active event 320c. The active event 320a include event-generating parameters 324a, context parameters 324b, and registrant-time data 324c. The active event DB 318 may include events for which registration is currently open, or events for which registration has not yet begun (and may not yet be presented in the list of events 202). The event-generating parameters 324a, context parameters 324b, and registrant-time data 324c may be similar to the event-generating parameters 322a, context parameters 322b, and registrant-time data 322c of the historical event 316a, except that the registrant-time data 322c of the active event 320a may only include time—number-of-registrant pairs up to a current time (T Current), rather than up to TEND, as registration has not yet closed for the active event 320a.

Referring now to FIG. 5, FIG. 5 shows an example embodiment of a process for generating a similarity score between a first event and a second event. This can be used to determine a set of first events that are similar to a second (target) event, and the registrant projector 310 can perform analysis using the set of similar first events to project a number of registrants for the second event, as described herein. The process can be performed by the event similarity score generator 308. In a brief overview, the event similarity score generator 308 can set a parameter index "n" to one, or some initial value (BLOCK 502). The event similarity score generator 308 can select an nth parameter for a first event (e.g. a historical or active event), and an nth parameter for a second event (e.g. a target event) (BLOCK 504). The event similarity score generator 308 can calculate a similarity between the parameter values of the nth parameter for the first event and the nth parameter for the second event (BLOCK 506). The event similarity score generator 308 can apply a parameter weight to the calculated similarity, and can add the result to a total similarity score (BLOCK 508). The event similarity score generator 308 can determine whether the index n is equal to N (a total number of parameters being considered by the event similarity score generator 308) (BLOCK 510).

If the event similarity score generator 308 determines that the index n is not equal to N, the process proceeds to BLOCK 512, and the event similarity score generator 308 can then increment n, and the process can proceed to BLOCK 504. If the event similarity score generator 308 determines that the index n is equal to N, the process proceeds to BLOCK 514, and the event similarity score generator 308 can determine whether the similarity score is less than (or, in other embodiments, equal to) a threshold, such as a pre-determined threshold. If the event similarity score generator 308 determines that the similarity score is below the threshold, the process proceeds to BLOCK 516, and the first event is added to a sub-group of events (a sub-group of the events being analyzed) that are similar to the second (target) event. The process then proceeds to BLOCK 518, and a next event is analyzed for similarity with respect to the second event, or the process may end. If, at BLOCK 514, the event similarity score generator 308 determines that the similarity score is not below the threshold, the process proceeds directly to BLOCK 518, or ends.

In more detail, at BLOCK 504, the event similarity score generator 308 can select an nth parameter of a first event (e.g. a historical event). The nth parameter may be any of the event parameters described herein, such as, for example, an event-generating parameter or a context parameter. The nth parameter may be a registrant profile parameter. The event similarity score generator 308 may further select an nth parameter of a second event. The nth parameter may correspond to the nth parameter of the first event (e.g. may be the same parameter).

At BLOCK 506, the event similarity score generator 308 may calculate a similarity between the value for the nth parameter of the first event and the value for the nth parameter of the second event. This similarity may be based on a direct similarity (e.g. if the parameter is an entry fee, the similarity may correspond to a difference between the respective entry fees of the first event and the second event), or may be a similarity determined in some other manner, such as by reference to a look-up table (LUT). The LUT may be accessible to the event similarity score generator 308, and may describe a number of "similarity points" that correspond to parameter value pairs for particular parameters. For example, if the parameter is a day of the week, and the first parameter value correspond to Saturday and the second parameter value corresponds to Sunday, the LUT may indicate that a first number of similarity points corresponds to this difference in parameter values for the day-of-the-week parameter. If the first parameter value correspond to Wednesday and the second parameter value corresponds to Sunday, the LUT may indicate that a second number of similarity points smaller than the first number corresponds to this difference in parameter values for the day-of-the-week parameter, indicating a greater similarity between a Saturday-Sunday pair than between a Wednesday-Sunday pair. Parameter values may correspond to parameter value groups (e.g. to a "small entry fee" group, or to a "large entry fee" group), and similarities between corresponding groups may be determined rather than directly determining similarities between the parameter values.

At BLOCK 508, the event similarity score generator 308 may apply a weight corresponding to the nth parameter to the similarity (e.g. to the similarity points) calculated at BLOCK 506. The weight may be, for example, a predetermined weight. The weight may be a weight determined by a machine learning algorithm trained on a set of events (e.g. a set of events including annotations indicating similarity between the events). This can provide for weighing parameter value similarities according to the importance of the corresponding parameter, and can provide for an improved method of generating a similarity score.

As described above, at BLOCKs 514-516, the event similarity score generator 308 may determine that a similarity score is greater than a pre-determined threshold, and responsive to this determination may assign the first event to a sub-group, the sub-group including events similar to the second event. This sub-group of events similar to the second event can be used in subsequent analysis, as described herein. Using the sub-group of similar events, rather than analyzing every event for which data is stored, can provide for more efficient and less computer-resource-intensive analysis. For example, the registrant projector 310 may perform analysis on a group of events to generate a projected number of registrants for the second event. By limiting the analysis to only those events that are similar to the second event and omitting other events, the registrant projector 310 may use less computing resources to perform the analysis.

Referring now to FIG. 6, FIG. 6 shows an example embodiment of a process for generating a projected registrant profile, and for projecting a number of registrants for an event. The process can be performed by the registrant projector 310. In a brief overview, the registrant projector 310 can set an index "n" of events similar to a target event to 1 (or some other initial value) (BLOCK 602). The registrant projector 310 can select the nth similar event of a group of similar events (e.g. a sub-group of similar events determined by the process depicted in FIG. 5) (BLOCK 604). The registrant projector 310 can determine a number M registrant profile parameters for the nth similar event (BLOCK 606). The registrant projector 310 can determine whether the index n is equal to a total number of similar event N (BLOCK 608). If the registrant projector 310 determines that the index n is not equal to a total number of similar event N, the process proceeds to BLOCK 610, the registrant projector 310 increments the index n, and the process proceeds to BLOCK 604. If the registrant projector 310 determines that the index n is equal to the total number of similar event N, the process proceeds to BLOCK 612, and the registrant projector 310 sets an index m of registrant profile parameters to 1 (or some other initial value). The registrant projector 310 can aggregate the respective mth registrant profile parameter values of the N similar events to generate an mth registrant profile parameter value for the target event (BLOCK 614). The registrant projector 310 can determine whether the index m is equal to the total number of registrant profile parameters M (BLOCK 616). If the registrant projector 310 determines that the index m is not equal to the total number of registrant profile parameters M, the process proceeds to BLOCK 618, the registrant projector 310 increments m, and the process proceeds to BLOCK 614. If the registrant projector 310 determines that the index m is equal to the total number of registrant profile parameters M, the process proceeds to BLOCK 620, and the registrant projector 310 can generate a projection of a number of registrants for the target event at a time T, using the M generated registrant profile parameters.

In further detail, at BLOCK 604, the registrant projector 310 can select an nth similar event from a group of events determined by the event similarity score generator 308 to be similar to the target event. At BLOCK 606, registrant projector 310 can determine registrant profile parameters for the nth similar event. The registrant profile parameters for the nth similar event can be generated dynamically during the process depicted in FIG. 6, or can be retrieved by the registrant projector 310 (e.g. from a database, such as the historical DB 314). The registrant profile parameters for the nth similar event can be generated as described above with reference to FIG. 3.

At BLOCK 614, the registrant projector 310 can aggregate the respective mth registrant profile parameter values of the N similar events to generate an mth registrant profile parameter value for the target event. The registrant projector 310 can aggregate the respective mth registrant profile parameters based on properties or weights. In some embodiments, properties as used herein may refer to weights or weight values. For example, the weights can be, or can be based on, similarity scores calculated by the event similarity score generator 308 for the target event—nth similar event pairs. In this way, events that are more similar to the target event than are other events are accorded more weight in the determination of registrant profile parameter values for the target event, which may lead to a more accurate projection. The weights can be calculated using a machine-learning algorithm (e.g. a machine-learning algorithm that implements a similarity score as a feature). Such a machine-learning algorithm can, for example, be trained on an annotated data set that includes complete registrant-time data for a plurality of events as well as corresponding similarity scores. The weights determined by the machine-learning algorithm can, when used in the process shown in FIG. 6, provide for determining accurate registrant profile parameters for a target event and for an accurate projection of a number of registrants for the target event at a time T. At BLOCK 620, the registrant projector 310 can project a number of registrants for the target event at a time T, using the M generated registrant profile parameter values for the target event. For example, the registrant projector 310 can determine an equation describing a number of registrants for the target event as a function of time based on the M generated registrant profile parameters for the target event. This equation can be used to project the number of registrants for the target event at an arbitrary time.

Figure 7A:
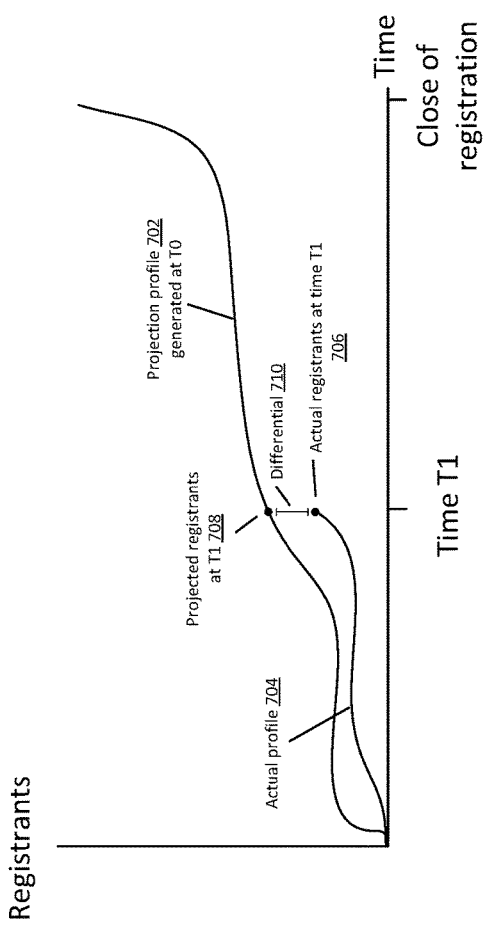
FIG. 7A and FIG. 7B show one or more embodiments of a projected registrant profile and an actual registrant profile at a time T1 and a time T2, respectively.

Referring now to FIG. 7A, FIG. 7A shows a projection profile 702 for an active target event. The projection profile 702 can in the depicted example is generated at time T0 (e.g. at an opening of registration for the active target event). The projection profile 702 shows a projected number of registrants for the target event as a function of time, for a plurality of times up until a time at which registration closes. FIG. 7A also shows an actual profile 704, which shows an actual number of registrants for the target event, up to a time T1 (e.g. a current time). A differential 710 shows a difference between the projected number of registrants at time T1 708 and the actual number of registrants at time T1 (706). As can be seen, the actual number of registrants at time T1 is below the projected number. This may indicate that the target event (and may imply that other active events) are under-saturated. The pace tracker 312 may determine the differential 710 at a time T1. The pace tracker 312 may determine the differential 710 at a time T1 based on a schedule for pace-tracking, such as checking every predetermined amount of time (e.g. by checking every second, every two seconds, or every three second, or any appropriate amount of time), or such as checking at one or more predetermined times). The pace tracker 312 may determine that the differential is above a threshold, and based on this determination, the pace tracker 312 may instruct the event generator 304 to restrict or to delay generation of a new event (e.g. by interrupting or revising a schedule for generating new events). Alternatively, the event generator 304 may request that the pace tracker 312 determine the differential 710 as part of a policy for generating a new event, and the event generator 304 may determine to restrict or delay generation of a new event based on the differential 710 being above a threshold. The event generator 304 may request that the pace tracker 312 determine a differential for a plurality of events to, for example, generate a total under-saturation score, and may restrict or delay generation of a new event based on the total under-saturation score. This can help to conserve computer resources, and may avoid opening, maintaining and updating unnecessary events. An example embodiment of this process is described herein in reference to FIG. 8B.

Figure 7B:
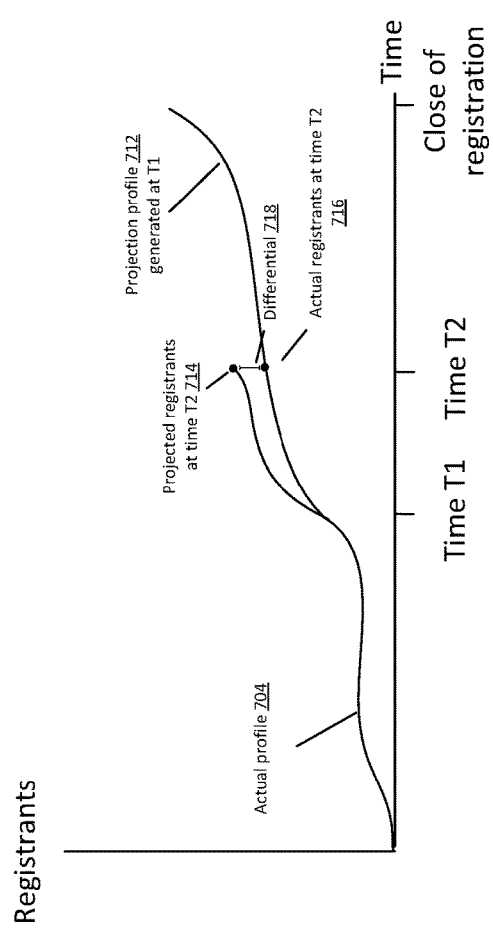

Referring now to FIG. 7B, FIG. 7B shows a projection profile 712 generated at the time T1 and an updated actual profile 704 at a time T2. The projection profile 712 can be determine by the registrant projector 310 at the time T1 or based on information determined at the time T1. The projection profile 712 can represent an updated projection profile for the active target event. The projection profile 712 can be updated every predetermined amount of time (e.g. by checking every second, every two seconds, or every three second, or any appropriate amount of time), or by updating at one or more predetermined times). The projection profile 712 can be generated at the time T1 based on updated registrant profile parameter values. The current registrant profile parameter values may change if the event similarity score generator 308 makes updated determinations as to which events are "similar" to the target event (based on updated registrant-time data for the target event), and the registrant projector 310 may thus determine updated registrant profile parameter for the target event based on the updated set of similar events to generate an updated projected final number of registrants. The registrant profile parameter values can be updated using Kalman filtering or linear quadratic estimation. The registrant profile parameter values can be updated based on a weighted average of older registrant profile parameters (e.g. determined at the time T0) and new registrant profile parameters (e.g. determined at the time T1). The weighs may be based on (e.g. proportional to) a differential between actual registrants and projected registrants for the respective times. For example, the registrant profile parameters determined at time T0 may be weighted based on the differential 710, and the registrant profile parameters determined at time T1 may be weighted based on the differential 718, and a weighted average of these registrant profile parameters may be used as the updated registrant profile parameters. In this manner, the projections can be performed dynamically to project whether one or more active events will be under-saturated at close of registration.

FIG. 7B also shows a differential 718 between a projected number of registrants 714 at time T2 and an actual number of registrants 716 at time T2. The differential 718 at time T2 is smaller than the differential 710 at time T1, showing that the saturation of the target event is improved (e.g. as a result of the event generator 304 determining to restrict or delay generation of a new event at time T1). The pace tracker 312 may determine that the differential 718 is below a threshold, and based on this determination the event generator 304 may generate a new event (e.g. according to a schedule or policy for generating new events).

In other embodiments, a desired number of final registrants (e.g. at close of registration) is compared to a current projected final number of registrants determined based on current registrant profile parameter values, and the pace tracker 312 determines a differential between the desired number of final registrants and the current projected final number of registrants. If this differential is above a threshold, the event generator 304 may restrict or to delay generation of a new event (e.g. in any of the manners described above).

Figure 8A:
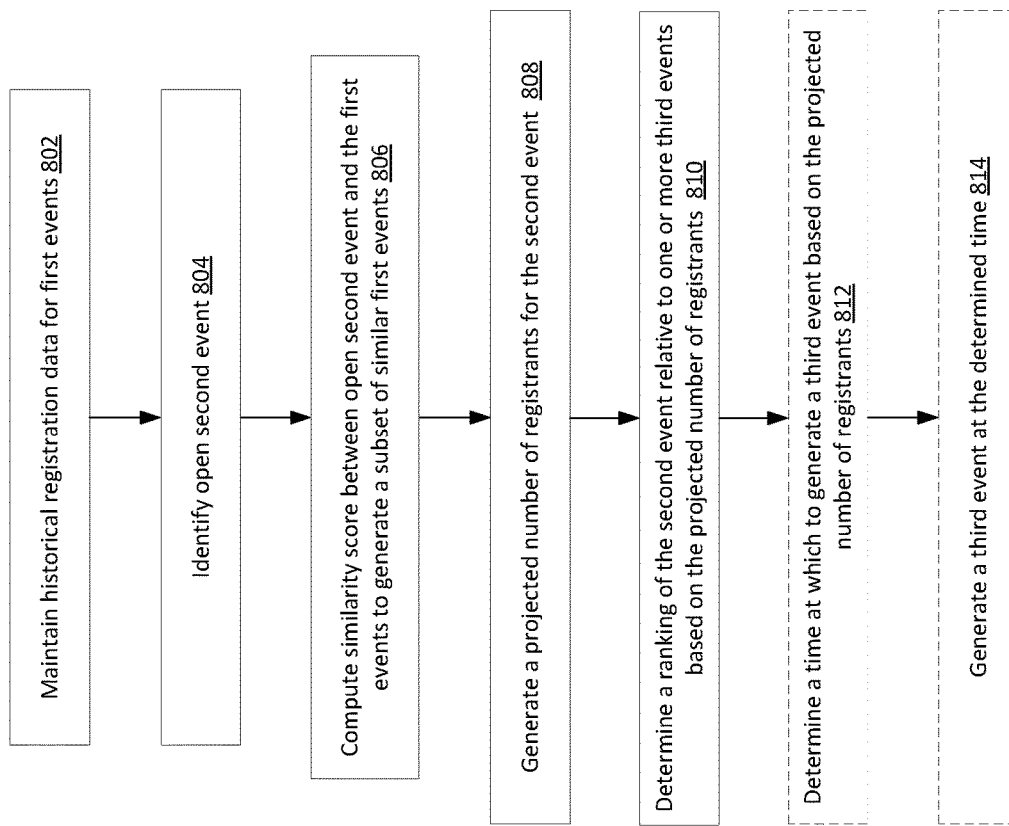
FIG. 8A is a flow chart showing one or more embodiments of a process for generating an event based on a determined time.

Referring now to FIG. 8A, FIG. 8A shows a process for generating an event at a determined time. As described above, in a brief overview, the event ranking system 302 can maintain historical registration data for one or more first events (e.g. in the historical event DB 314) (BLOCK 802). The event similarity score generator 308 can identify an open or active second event (e.g. by referencing the active event DB 318) (BLOCK 804). The event similarity score generator 308 can determine a similarity score between the active second event and each of the first events to generate a subset of similar events (BLOCK 806). The registrant projector 310 can generate a projected number of registrants for the second event at a time T (BLOCK 808). The pace tracker 312 can determine a ranking of the second event relative to one or more third events based on the projected number of registrants (BLOCK 810). The event generator 304 can determine a time at which to generate a fourth event based on the projected number of registrants (BLOCK 812). The event generator 304 can generate the fourth event at the determined time (BLOCK 814).

At BLOCK 802, the event ranking system 302 can maintain historical registration data for one or more first events (e.g. in the historical event DB 314). The event ranking system 302 can store the historical registration data for the one or more first events, and can update the historical registration data for the one or more first events. This can include storing one or more parameters for the one or more first events (e.g. event-generating parameters and context parameters), and can include storing and update time-registrant data pairs that indicate numbers of registrants at particular times for the one or more first events (e.g. times between an opening of registration for the event and close of registration for the one or more first event).

At BLOCK 804, the event similarity score generator 308 can identify an open or active second event. The event similarity score generator 308 can identify the open or active second event by referencing the active event DB 318. The active event DC 318 can be maintained by the event ranking system 302, which can include storing one or more parameters for the second event (e.g. event-generating parameters and context parameters), and can include storing and update time-registrant data pairs that indicate numbers of registrants at particular times for the second event (e.g. times between an opening of registration for the second event and close of registration for the second event). The event similarity score generator 308 can reference this information to identify the open or active second event.

At BLOCK 806, the event similarity score generator 308 can determine a similarity score between the active second event and each of the first events to generate a subset of similar events. The event similarity score generator 308 can determine a similarity score between the first events and the second events based on respective parameter values for parameters of the events (e.g. event-generating parameters of the events and/or registrant profiles of the events). The event similarity score generator 308 can determine a similarity score based on determining a similarity between parameter values of parameters of the pair of events as described herein with respect to FIG. 5. The event similarity score generator 308 can determine the similarity score based on applying properties or weights (e.g., pre-determined properties, pre-determined weights) to the determined similarity between parameter values. The event similarity score generator 308 may determine a similarity score for each of the first events relative to the second event. The event similarity score generator 308 may generate a subset of events of the set of first events (for which, for example, each event of the subset of events has a similarity score above a threshold, or for which the subset of events includes a predetermined number of events having the highest similarity score of the set of first events). An example embodiment of the event similarity score generator 308 generating a similarity score for each of a set of first events relative to a second event is shown in FIG. 5.

At BLOCK 808, the registrant projector 310 generate a projected number of registrants for the second event at a time T. The registrant projector 310 can determine one or more registrant-profile parameters for the second event. For example, the registrant projector 310 can determine one or more registrant-profile parameters for the second event based on registrant-profile parameters of events determined by the event similarity score generator 308 to be similar to the second event. The determined registrant-profile parameters for the second event can be used to project a number of registrants for the second event at a point in time between opening of registration and close of registration for the second event. An example of such projection by the registrant projector 310 is shown in FIG. 6. The registrant-profile parameters may include parameters for a linear equation that is a function of time that outputs a projected number of registrants at a given time. A "projection profile" can be a set of such outputs across a span of time.

At BLOCK 810, the pace tracker 312 can determine a ranking of the second event relative to one or more third events based on the projected number of registrants. The pace tracker 312 can rank the second event and the third events based on respective pace statuses. For example, the pace tracker 312 can determine, for the second event and for each event of the plurality of third events, to what degree the event is under-saturated or below pace (e.g. by how many participants the event is below pace, or by a percentage difference between an "on pace" number of participants (e.g. the projected or desired number of participants) and the projected pace, either at the current time or at a future time (e.g. at close of registration)). The pace tracker 312 can determine a rank for the second event each of the plurality of third events (or for a sub-set of the plurality of third events having being under-saturated or below pace to a degree that is equal to or greater than a threshold) based on the pace statuses.

At BLOCK 812, the event generator 304 can determine a time at which to generate a fourth event based on the projected number of registrants, and at BLOCK 814, the event generator 304 can generate the fourth event at the determined time. The event generator 304 can be further configured to generate the fourth event at a particular timing or according to a schedule or based on upcoming games. For example, the event generator 304 can be configured to generate the fourth event corresponding to an upcoming game, or corresponding to a set of games played on one or more days (e.g. on a particular day or in a particular week). The event generator may be configured to generate the fourth event when an active event hits its fixed registrant cap (has a number of registrants equal to a fixed registrant cap). In some embodiments, the operations of BLOCK 812 may be omitted.

The event generator 304 can be further configured to generate the fourth event at a determined time based on data received from another component, subsystem, module, script, or application of the event ranking system 302. For example, the event generator 304 can be configured to determine a time at which to generate the fourth event based on a pacing determined by the pace tracker 312 (e.g. a pacing of one or more active events). The event generator 304 can be configured to deviate from a schedule (e.g. to delay generation of the fourth event, or to set generation of the fourth event to a time T) based on a pacing determined by the pace tracker 312. The event generator 304 can determine a timing for generating the fourth event based on pacing information for more than one event, and may weigh the pacing information based on features of the one or more events (e.g. based on respective total numbers of registrants for the events, and/or based on respective registrant caps for the events). For example, as is described in more detail herein with reference to the pace tracker 312, the pace tracker 312 may determine that one or more active events are under-saturated (e.g. are below a projected or desired pace for the active event, or below a projected or desired number of registrants). The event generator 304 may be configured such that, based on or responsive to this determination, the event generator 304 delays generation of the fourth event (e.g. sets a time for generating the fourth event to be later than a time include in a schedule). In some embodiments, the operations of BLOCK 814 may be omitted.

The event generator 304 may determine a time at which to generate the fourth event based on a policy for generating new event. The policy may include the schedule for generating new events including the fourth event, and may include candidate times for generating the fourth event. The policy may include one or more rules for determining, at one of the candidate times for generating the fourth event, via the pace tracker 312 of the event ranking system 302, whether one or more events is under-saturated, and responsive to determining that the one or more events is under-saturated, delaying generating the fourth event at the one of the candidate times for generating a new event. This can provide for in conserving computer resources by restricting the event generator 304 from generating new events when a number of currently active events is determined to be sufficient to satisfy registrant needs.

Figure 8B:
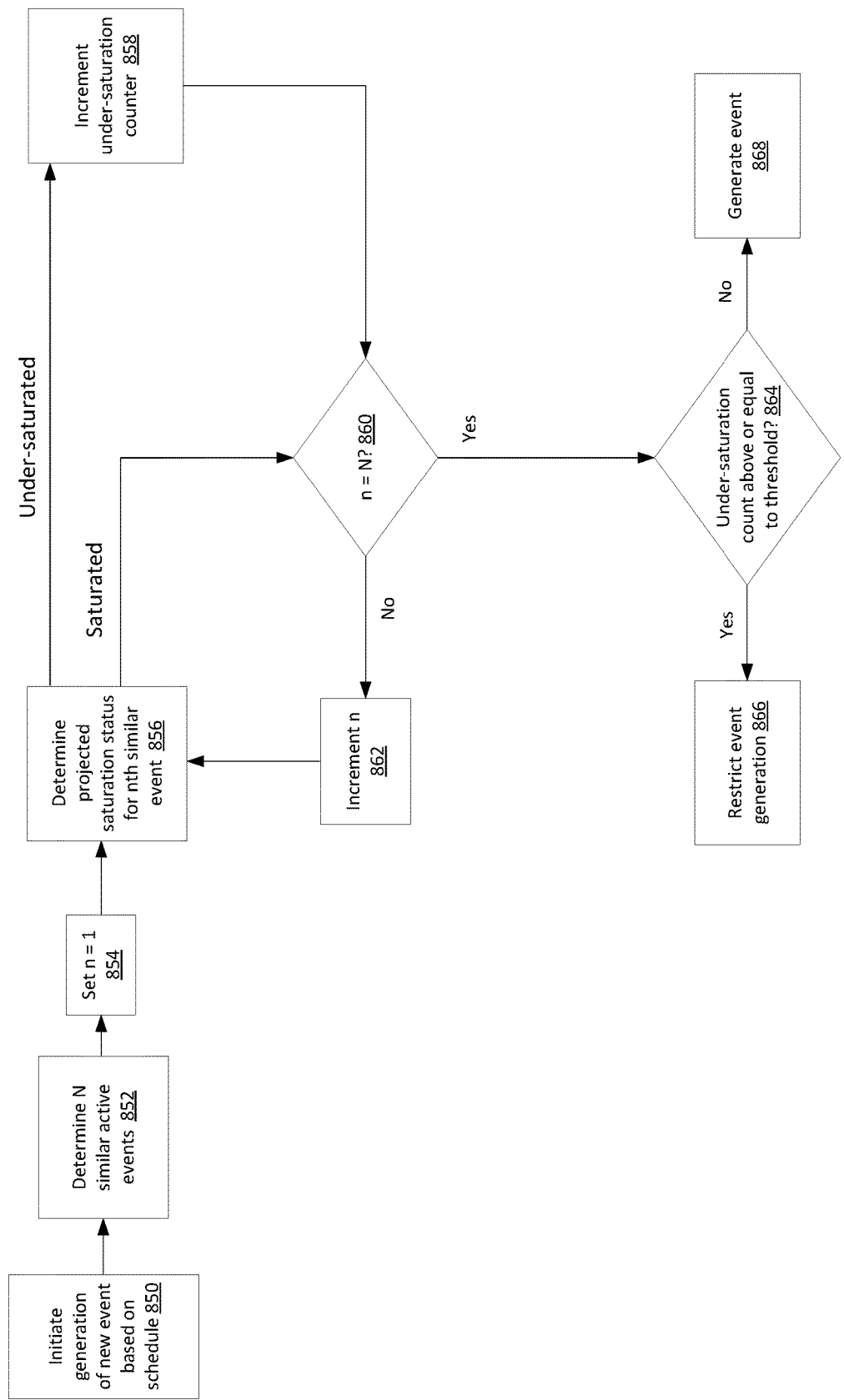
FIG. 8B is an example embodiment of a process for generating an event based on a schedule.

Referring now to FIG. 8B, FIG. 8B shows an example embodiment of a process for generating an event based on a schedule. This can provide for an improved allocation of computing resources (e.g. by restricting generation of new events when active events are projected to be under-saturated (have a number of registrants below a predetermined threshold)). The process can be performed by the event generator 304. In a brief overview, the event generator 304 can initiate generation of a new event based on a schedule (BLOCK 850). The event generator 304 can determine N similar active events (BLOCK 852). The event generator 304 can set a parameter index "n" to one, or some initial value (BLOCK 854). The event generator 304 can determine a projected saturation status for an nth similar event of the N similar events (BLOCK 856). If the projected saturation status is "under-saturated", the process proceeds to BLOCK 858, the event generator 304 increments an under-saturation counter, and the process proceeds to BLOCK 860. Otherwise, the process proceeds directly to BLOCK 860.

The event generator 304 determines whether the index n is equal to N. If the index n is not equal to N, the process proceeds to BLOCK 862, the event generator 304 increments the index n, and the process proceeds to BLOCK 856. Otherwise, the process proceeds to BLOCK 864. The event generator 304 determines whether an under-saturation count is above or equal to a predetermined threshold (BLOCK 864). If the under-saturation count is not above or equal to a predetermined threshold, the process proceeds to BLOCK 866, and the event generator 304 restricts event generation. Otherwise, the process proceeds to BLOCK 868, and the event generator 304 generates the new event.

In more detail, referring to BLOCK 850, the event generator 304 can initiate generation of a new event based on a schedule. The new event can be generated based on a set of event-generating parameters. The schedule can be, for example, a list of timings at which to generate a new event, or can be an instruction received from another component of the event ranking system 302 to start a new event, or can be a policy for generating a new event. The schedule can specify the event-generating parameters for the new event. The event generator 304 can determine that the schedule demands initiating generation of a new event, and can begin the process shown in FIG. 8B.

At BLOCK 852, the event generator 304 can determine N similar active events relative to the new event. For example, the event similarity score generator 308 can determine N similar active events based on the event-generating parameters of the new event, and can provide an identification or count of the N similar active events to the event generator 304.

At BLOCK 854, the event generator 304 can initialize an index n (e.g. to 1, or to some other initial value). The index n can correspond to the N similar active events determined at BLOCK 852.

At BLOCK 856, the event generator 304 can determine can determine a projected saturation status for an nth active event of the N similar active events. The projected saturation status can be determined by the registrant projector 310, and can be based on a determination of whether a projected number of registrants for the nth active event at a time T (e.g. at close of registration) is equal to or above a predetermined threshold. The registrant projector 310 can determine that the nth active event of the N similar active events is "saturated" if the nth active event is equal to or above the predetermined threshold, and can determine that the nth active event of the N similar active events is "under-saturated" if the nth active event is below the predetermined threshold. In some embodiments, the saturation status is a value (which can be positive or negative) based on a difference between the number registrants for the nth active event at the time T and the predetermined threshold. The event generator 304 can receive the saturation status of the nth active event from the registrant projector 310.

The event generator 304 can determine that the registration status is under-saturated and the process can proceed to BLOCK 858, at which the event generator 304 can increment an under-saturation counter, and the process can proceed to BLOCK 860. The event generator 304 can determine that the registration status is saturated, and the process can proceed to BLOCK 860. In some embodiments in which the saturation status is a value based on a difference between the number registrants for the nth active event at the time T and the predetermined threshold, at BLOCK 856 the increment the counter based on the value (e.g. by the value), and the process can proceed to BLOCK 860.

At BLOCK 860, the event generator 304 can determine whether the index is equal to the number N of active similar events. The event generator 304 can determine that the index is not equal to the number N of active similar events, and the process can proceed to BLOCK 862, the event generator 304 can increment the index n, and the process can proceed to BLOCK 856. The event generator 304 can determine that the index is equal to the number N of active similar events, and the process can proceed to BLOCK 864.

At BLOCK 864, the event generator 304 can determine whether an under-saturation count of the under-saturation counter is above or equal to a predetermined threshold. The event generator 304 can determine that the under-saturation count of the under-saturation counter is above or equal to the predetermined threshold, the process can proceed to BLOCK 866, and the event generator 304 can restrict generation of the new event. Restricting generation of the new event can include determining not to generate the new event and terminating the process for generating a new event. Restricting generation of the new event can include revising the schedule based on the determination to restrict generation of the new event (e.g. rescheduling generation of the event to a new time).

At BLOCK 864, the event generator 304 can determine that the under-saturation count of the under-saturation counter is less than the predetermined threshold, the process can proceed to BLOCK 868, and the event generator 304 can generate the new event (e.g. based on the event-generating parameters of the new event).

The process depicted in FIG. 8B can provide for improved allocation of computing resources by restricting generation of events based on a determination that one or more active events are projected to be under-saturated, which may indicate that the active events have capacity to accept many registrants and that generation of a new event (and corresponding use of computing resources) is not necessary.

C. Systems and Methods For Generating Event Recommendations to Direct Registrations Across Events The following description relates to one or more systems and methods of generating an event recommendation for a user. Event recommendations can be generated to direct registrations across events, and to optimize registrant dispersion to conserve computing resources. For example, an event recommendation can be generated to direct one or more registrants to an event that is projected to be under-saturated. This can provide for improved allocation of computing resources by directing registrants to a smaller number of events, rather than having registrants disperse across a larger number of events. Generation and/or maintenance of an event may involve a computing resource cost, and directing registrants to a smaller number of events can provide for a better computing resource per user ratio, which can represent an improvement in computing resource allocation.

The event management system 206 may include components, subsystems, modules, scripts, applications, or one or more sets of computer-executable instructions configured to prioritize events included in a plurality of events for the user and generate a content item corresponding to one of the events to provide to the user, and may implement any of the systems and methods described herein to do so.

Referring now to FIG. 9A, FIG. 9A shows a user history 902 of a user profile. The user history 902 can include one or more historical events that are associated with a user (e.g. in which a user has participated). The historical events can be events in which the user has registered and which have not yet ended, or can be events that have ended. The user history 902 shows three events E1', E2', and E3' by way of example, but any number of events can be included in a user history. The event may be associated with information including values for parameters (e.g. any parameters described herein, including event-generating parameters and context parameters). The user history 902 includes a parameter value for a "sports" parameter and a parameter value for a "style" parameter.

FIG. 9B shows active events 904. Active events 904 can include events open for registration. The active events 904 can be included in a database accessible to the event management system 206. The active events 904 may be events for which registration is open, or for which registration is possible. Although the active events 904 shown in FIG. 9A include three events E1 through E3, any number of active events 904 can be included.

The active events 904 may include, for one or more of the events E1 through E3 (e.g. for each event), a sports parameter value and an event style parameter value, and may include other information corresponding to the events E1 through E3 (e.g. information corresponding to any of the parameters described herein). The active events 904 may also include a similarity parameter value and a similarity rank that are specific to a user or a set of users. The similarity parameter value may indicate whether the event is considered "similar" to events that user or set of users have participated in or are registered for. The similarity rank may indicate how similar the event is, relative to other similar events. As shown in FIG. 9B, the events E2 and E3 are "similar" events for a user of interest. This can be determined by matching parameter values of the events E2 and E3 to the parameter values of the events included in the user history 902, or in any other appropriate manner. Systems and methods for making this determination are provided below. The events E2 and E3 may also be ranked, along with other similar events (not shown), based on their similarity to events included in the user's history. The event E2 has a highest rank (rank 1), and may be identified as a similar event 906 based on this rank.

Figure 9C:
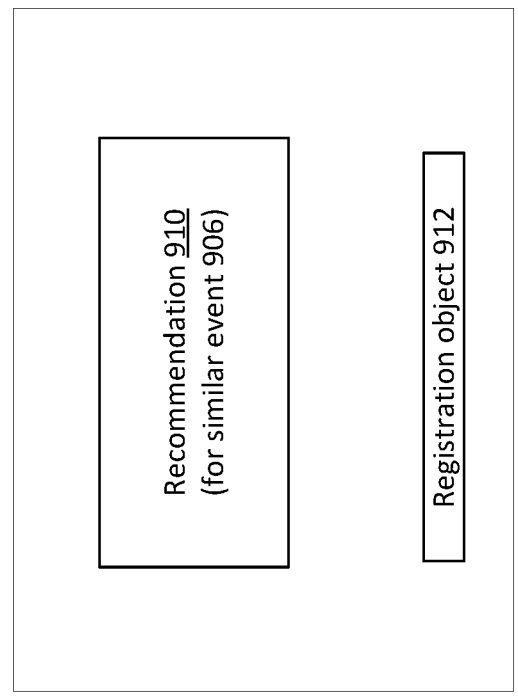
FIG. 9C depicts one or more embodiments of a content item.

FIG. 9C shows a content item 908. The content item 908 can be displayed on a client device (e.g. a client device associated with the user profile that includes the user history 902), and data for displaying, rendering, or otherwise providing the content item 908 can be transmitted by the event management system 206 to the client device associated with the user profile. The event management system 206 may generate the content item 908 or may request that another system generate the content item 908. The content item 908 can include a recommendation 910 and a registration object 912. The recommendation 910 can include a media item (e.g. any combination of text, image, video, or user-interactive content), and the media item can reference the similar event 906. For example, the recommendation 910 can include text that recommends the similar event 906 to the user. The registration object 912 can include an object that the user can interact with to facilitate registration in the similar event 906. For example, the registration object 912 can include a user-selectable hyperlink that initiates a process to download a webpage, or initiate a process of an application, for registering for the similar event 906.

Figure 10:
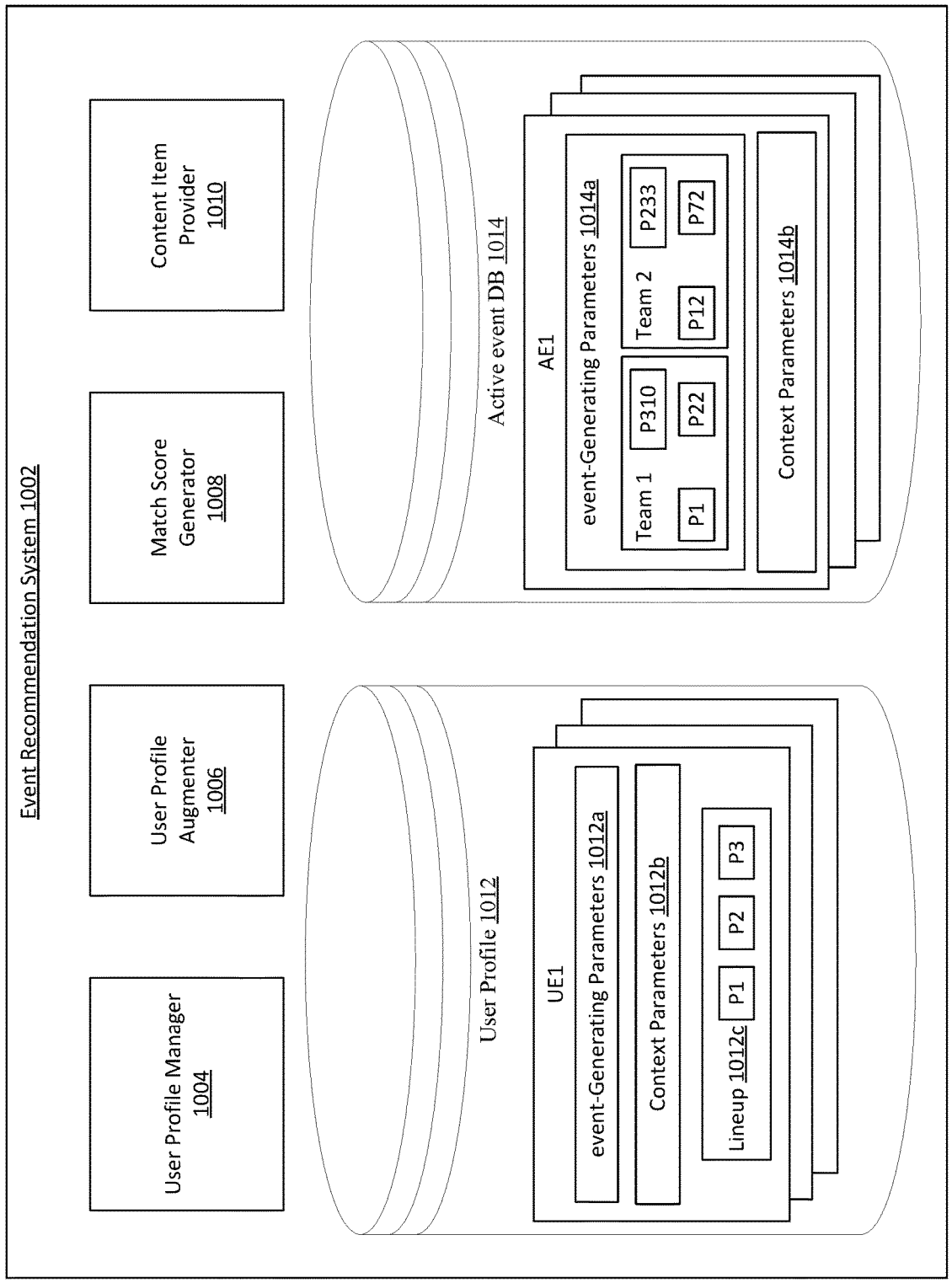
FIG. 10 is a block diagram depicting one or more embodiments of an event recommendation system.

Referring now to FIG. 10, FIG. 10 is a block diagram showing an embodiment of an event recommendation system 1002 that can be included in the event management system 206. The event recommendation system 1002 can include or be executed on one or more servers, such as the servers 106 shown in FIG. 1A. The event recommendation system 1002 can include one or more applications, services, routines, servers, daemons, or other executable logics for generating an event, including one or more of a user profile manager 1004, a user profile augmenter 1006, a match score generator 1008, and a content item provider 1010. The event recommendation system 1002 can also include, access, maintain or manage one or more data structures, including but not limited to a user profile 1012 and an active event DB 1014.

The user profile 1012 may include historical user events that include events that have ended, and events in which the user is registered but have not ended. Each historical user event, such as the user event 1 (UE1) shown in FIG. 10, can include event-generating parameters 1012a and context parameters 1012b. The event-generating parameters 1012a and context parameters 1012b can be similar to the event-generating parameters 322a and context parameters 322b shown and described with respect to FIG. 3. One or more historical user events can include a lineup 1012c associated with the one or more user events. The lineup 1012c can include a list of one or more players P1, P2, P3 (or any number of players) associated with the historical user event. For example, the event may be any event that a user or client device can register for. For instance, the event can be a fantasy football event, and the lineup 1012c may include players that were drafted, activated, or played by the user in the historical user event. The lineup 1012c may include players that are otherwise associated with the event, including, for example, players that are part of one or more teams associated with the historical user event.

The active event DB 1014 can include one or more active events, including the active event 1 (AE1) shown in FIG. 10. The active events can be events for which registration is still open. Each event in the active event DB 1014 can include event-generating parameters 1014*a* (e.g. any event-generating parameters described herein), and context parameters 1014*b* (e.g. any context parameters described herein). In some embodiments, the events included in the active event DB 1014 may include or otherwise be associated with a list of players that users can select from to generate their lineups. In some embodiments, the players can be associated with one or more teams.

The user profile manager 1004 can include components, subsystems, modules, scripts, applications, or one or more sets of computer-executable instructions and can be configured to manager a user profile 1012. The user profile manager 1004 can generate, maintain, or update the user profile 1012. The user profile manager 1004 can maintain the user profile 1012 by, for example, adding historical user events to the user profile 1012 (and corresponding information for the historical user event) as the user enters events, or as events in which the user is entered end. The user profile manager 1004 can determine statistical features related to the parameter values (e.g. for event-generating parameters 1012*a* and context parameters 1012*b*, and/or for one or more players of the lineup 1012*c*) of the user historical events of the user profile 1012, and can provide those statistical features to the match score generator 1008, or to any other component of the event recommendation system 1002.

The user profile augmenter 1006 can include components, subsystems, modules, scripts, applications, or one or more sets of computer-executable instructions for augmenting a user profile. In some embodiments, the user profile 1012 does not include some desired information. For example, the user profile 1012 may omit a historical event having a parameter of interest, or may include an insufficient number of historical events that include the parameter of interest to satisfy a desired sample size. For example, the parameter of interest may be a sport. The user profile manager 1004 may determine a parameter value having a highest incidence in the user profile 1012 for a set of parameters including the sport parameter, the incidence being higher than a predetermined threshold (e.g. to ensure a satisfactory sample size), and may report that parameter value to the match score generator 1008 for determining a similar event. The user profile 1012 may only include a small number of historical user events, such that no sport has an incidence higher than the predetermined threshold. In order to determine a similar event in the active event DB 1014 similar to the events included in the user profile 1012, the user profile augmenter 1006 can augment the user profile. The user profile augmenter 1006 can augment the user profile by performing operations that include determining expanded statistics related to a set of parameter values for the user profile 1012, or categorizing the user profile 1012 as belonging to a set of similar user profiles, and determining statistical features based on an expanded set of parameter values that corresponds to the set of similar user profiles.

The user profile augmenter 1006 can augment the user profile by determining expanded statistical features related to a set of parameter values for the user profile 1012. For example, to continue with the example provided above, the user profile augmenter 1006 can determine a sport having a highest incidence for the user profile 1012 by inferring or predicting the statistical feature based on similar user profiles. In some embodiments, this is implemented using collaborative filtering. An example of such collaborative filtering is described below with respect to FIG. 11.

The user profile augmenter 1006 can augment the user profile 1012 by adding to the target profile, or associating with the user profile 1012, a list of similar user profiles. For example, the user profile augmenter 1006 can implement a clustering algorithm on a set of user profiles to generate clusters of similar user profiles, and can use the clustering algorithm to determine to which cluster the user profile 1012 belongs. In some embodiments, the user profile augmenter 1006 can determine a set of user profiles similar to the user profile 1012 based on matching features of historical events included in the user profile 1012 and features of historical events included in the other user profiles.

The user profile augmenter 1006 can augment the user profile by categorizing the user profile 1012 as belonging to a set of similar user profiles, and determining statistics based on an expanded set of parameter values that corresponds to the set of similar user profiles. The user profile 1012 may be so-clustered, and may be tagged as belonging to a particular set of similar users. The user profile manager 1004 may determine statistics for the particular set of similar users, and may assign those statistics to the user profile 1012. For example, the user profile manager 1004 can perform any of the operations described herein using historical events (and associated information) included in any of the user profiles of the particular set of similar user profiles. The user profile manager 1004 may weigh the user profile 1012 more heavily than other user profiles when determining the statistics. This can provide for an augmented user profile that can be used by the match score generator 1008 to determine similar events.

The match score generator 1008 can include components, subsystems, modules, scripts, applications, or one or more sets of computer-executable instructions for determining a match score for a candidate event. The match score can be for a user profile (or for an augmented user profile—for brevity, the phrase "user profile" may be used herein to refer to both a user profile and/or an augmented user profile), and can correspond to a determined similarity between a user profile and a candidate active event included in the active event DB 1014. The match score generator 1008 can determine a total event match score for a candidate active event. The total event match score can be an aggregation of sub-scores. The sub-scores can include, for example, a player match score or first entity match score (e.g. a score that corresponds to matching between one or more players (or first entities) included in, or otherwise associated with, the user profile and one or more players (or first entities) included in, or otherwise associated with, the candidate active event), a team-match score (e.g. a score that corresponds to matching between one or more teams included in, or otherwise associated with, the user profile and one or more teams included in, or otherwise associated with, the candidate active event), or a match score for any parameter described herein. The match score generator 1008 can determine properties or weights for event parameters, and the match score may be a weighted count of matching parameter values between the user profile and the candidate event using the generated properties or weights. Thus, the match score generator 1008 can determine one or more sub-scores, and can aggregate the sub-scores to determine a total match score for the candidate event relative to the user profile.

In some embodiments, the match score generator 1008 can generate a total event match score by aggregating a content-based match score and a collaborative-filtering-based match score. A content-based match score can be a match score based on a determination of a similarity between one or more features of historical events included in the user profile 1012 and features of active events included in the active event DB 1014. Such a similarity can be determined, for example, by the event similarity score generator 308. This can provide for matching the user profile 1012 with active events that have preferred features.

A collaborative-filtering-based match score can be a match score based on a determination of a similarity between the user profile 1012 and other user profiles. For example, the collaborative-filtering-based match score can be based on a determination that one or more similar user profiles (e.g. determined to be similar as described above, such as via clustering) are currently registered for one or more active events. Each candidate active event being analyzed can be awarded match score points based on a weighted sum of similar user profiles that are currently registered for the active event (e.g. weights can be implemented based on a degree of similarity of the similar user profiles to the user profile 1012). In some embodiments, collaborative-filtering can be implemented to augment the user profile 1012 to determine new preferences for features (e.g. as described above), and the match score generator 1008 can generate a match score based on those new preferences.

In some embodiments either the collaborative-filtering-based match score or the content-based match score can be implemented independently. For example, the match score generator 1008 can generate a total event match score without implementing the content-based match score (e.g. only implementing the collaborative-filtering-based match score), or the match score generator 1008 can generate a total event match score without implementing the collaborative-filtering-based match score (e.g. only implementing the content-based match score). In some embodiments, the collaborative-filtering-based match score and the content-based match score can be implemented in a hybrid manner. For example, each of a collaborative-filtering-based match score and a content-filtering based match score can constitute sub-scores for a total event match score and can be aggregated to generate the total event match score. The aggregation may be a weighted average based on predetermined properties or weights. In some embodiments, properties as used herein may refer to weights or weight values generated. The weights may be tuned (e.g. determined) to correspond to a preference for a "macro" based approach (e.g. by more heavily weighing the collaborative-filtering-based, which can be based on preferences for sets of similar users) or to correspond to a preference for a "micro" based approach (e.g. by more heavily weighing the content-based match score, which can be based on preferences particular to the user profile 1012). The weights may be determined based on solicited feedback regarding the content recommendation system 1002 or outputs thereof.

The match score generator 1008 can determine an under-saturation score for the candidate event. The under-saturation score can be based on an under-saturation count or under-saturation value determined by the pace tracker 312 (e.g. using the method shown in FIG. 8B). Thus, the under-saturation score can correspond to a degree of projected under-saturation for the candidate event. Some embodiments provide for assigning a high under-saturation score to candidate events having a high under-saturation count or value. Some embodiments provide for assigning a small under-saturation score to candidate events that have high under-saturation counts or values (which it may be difficult or impossible to correct in a cost-effective or efficient manner) and/or for candidate events that have a low or negative under-saturation count or value (which may be deemed to be not significantly under-saturated), and for assigning a high under-saturation score to a candidate event having a saturation count or value falling within a "sweet spot" of readily correctable under-saturation. In some embodiments, the under-saturation score can be determined based on an under-saturation count or value's proximity to, or difference from, a predetermined value, or based on whether the under-saturation count or value falling within a predetermined range of values (a "sweet spot" range of values).

In some embodiments, the under-saturation score can be a sub-score that is aggregated with other sub-scores by the match score generator 1008 to determine the total match score for the candidate event relative to the user profile. In some embodiments, the under-saturation score can be used by the match score generator 1008 to rank candidate events or similar events, as described below.

The match score generator 1008 can determine a match score (e.g. a total match score, which can be a match score based on an aggregation of sub-scores including the under-saturation score) for each of a plurality of candidate active events, and can generate a ranking of candidate events based on the match scores. In some embodiments, the under-saturation score is used in the determination of the total match score (e.g. as a sub-score). In some embodiment, the under-saturation score may not be used in the determination of the total match score. The match score generator 1008 may determine a set of candidate events (e.g. all of the candidate events, or a smaller set of candidate events that satisfy one or more predetermined conditions (such as having a match score above a predetermined threshold)), and the match score generator 1008 may rank the set of candidate events based on the under-saturation score. For example, the match score generator 1008 may rank the candidate events of the set of candidate events in descending order from highest under-saturation score to lowest under-saturation score, or may employ any other appropriate ranking policy.

By incorporating the under-saturation score into the ranking the candidate events (e.g. as a sub-score of the total match score and/or in the final ranking), the content item provider 1010 can generate or transmit or request content items that recommend under-saturated events to a user associated with a user profile, the under-saturated events being "similar" to the user profile of the user, as described herein. Thus the content item provider 1010 can provide recommendations for relevant and under-saturated events to a user. This can provide for improved allocation of computing resources by directing registrants to a smaller number of events including under-saturated events, rather than having registrants disperse across a larger number of events which can involve allocation of computing resources to all of the larger number of events. Generation and/or maintenance of an event may involve a computing resource cost, and directing registrants to the smaller number of events can provide for a better computing resource per user ratio, which can represent an improvement in computing resource allocation.

The match score generator 1008 can determine that the candidate event is ranked higher than a predetermined number, and can responsively tag the candidate event as "similar" to the user profile. The match score generator 1008 can determine that a match score for a candidate event is above a predetermined threshold, and can responsively tag the candidate event as "similar" to the user profile. In some embodiments, the match score between a user profile and an active event indicates a level of relevance of the active event to a user of the user profile. In some embodiments, the match score between a user profile and an active event indicates a likelihood that a user of the user profile is likely to register for the active event.

The content item provider 1010 can include components, subsystems, modules, scripts, applications, or one or more sets of computer-executable instructions for providing a content item (such as the content item 902) to a client device. The content item can include a reference to one or more events that have a match score that satisfies a predetermined condition to a user profile associated with the client device. Such events may be referred to herein as "similar" events. For example, the content item provider 1010 can provide data for displaying or rendering the content item, or can instruct another system to provide such data. In some embodiments, the content item can be displayed with reference to a list of events 202 provided to the client device, and the content item provider 1010 can determine to include similar events in the list of events 202 (e.g. the similar events can be shown in a predetermined location in a user interface displaying the list of events 202).

The content item can include a reference to (e.g. can include a reference included in a text, an image, a video, a hyperlink, an interactive object for initializing an application, or another media item) the similar event. The reference may have one or more features. The features can include, for example, a stylistic feature (e.g. a particular text style (which can specify a size, a font, underlining, bold, italics, or another style, and in some embodiments the style can be different than another style used in the media item)), a predetermined location in the media item or a location defined relative to another object of the media item, a visual indicator associated with the reference to the similar event (e.g. a box, circle, or other visual indicator that surrounds or is otherwise positioned relative to the reference), or any other appropriate feature.

The content item can include a hyperlink or interactive object for initializing an application that, when executed, can cause the client device to display a list of events (e.g. such as the lobby 202), and the list of events can display one or more similar events according to one or more rules. For example, the lobby may display, on a page or tab of the lobby, similar events (e.g. only similar events), or may display the similar events in a predetermined location (e.g. in a prominent position in the lobby, such as at the top or start of a list of events), or can display the similar event according to one or more features, such as a stylistic feature (e.g. a particular text style (which can specify a size, a font, underlining, bold, italics, or another style, and in some embodiments the style is different than the another style used in the lobby), a visual indicator associated with the reference to the similar event (e.g. a box, circle, or other visual indicator that surrounds or is otherwise positioned relative to the reference), or any other appropriate feature.

Referring now to FIG. 11, FIG. 11 shows a reference table 1102 that may be used by the user profile augmenter 1006 to implement collaborative filtering. The reference table 1102 shows parameter value preferences generated by the user profile manager 1004 for five users: user 1 through user 5. The statistics show a highest incidence parameter value preference for the users for a set of event parameters that include: a sport, a style, an entry fee, and a day. The parameter value preferences are generated by the user profile manager 1004 based on respective user profiles for the users, and are only generated when a highest incidence parameter value has an incidence above a pre-determined threshold (e.g. to ensure an adequate sample size).

As shown in FIG. 11, user 5 does not have a highest incidence "day". This may be because user 5 has a user profile that includes a small number of historical user events that are distributed throughout the week, such that no day of the week has an incidence above a predetermined threshold. To augment the profile of the user 5, the user profile augmenter 1006 may implement collaborative filtering to determine a preferred day of the week for user 5. In implementing the collaborative filtering, the user profile augmenter 1006 may determine another user having similar parameter value preferences as the user 5. This determination may be based on a weighted count of matching parameter value preferences. The user profile augmenter 1006 may determine that user 1 has three parameter value preferences that match those of user 5, while the other users have less than three, and the user profile augmenter 1006 may identify the user 1 as being similar to the user 5 based on this determination. The user profile augmenter 1006 may then assign user 1's "day" preference of Sunday to user 5, to augment user 5's profile. This augmented profile can be used by the match score generator to determine a "similar event" for user 5.

Figure 12:
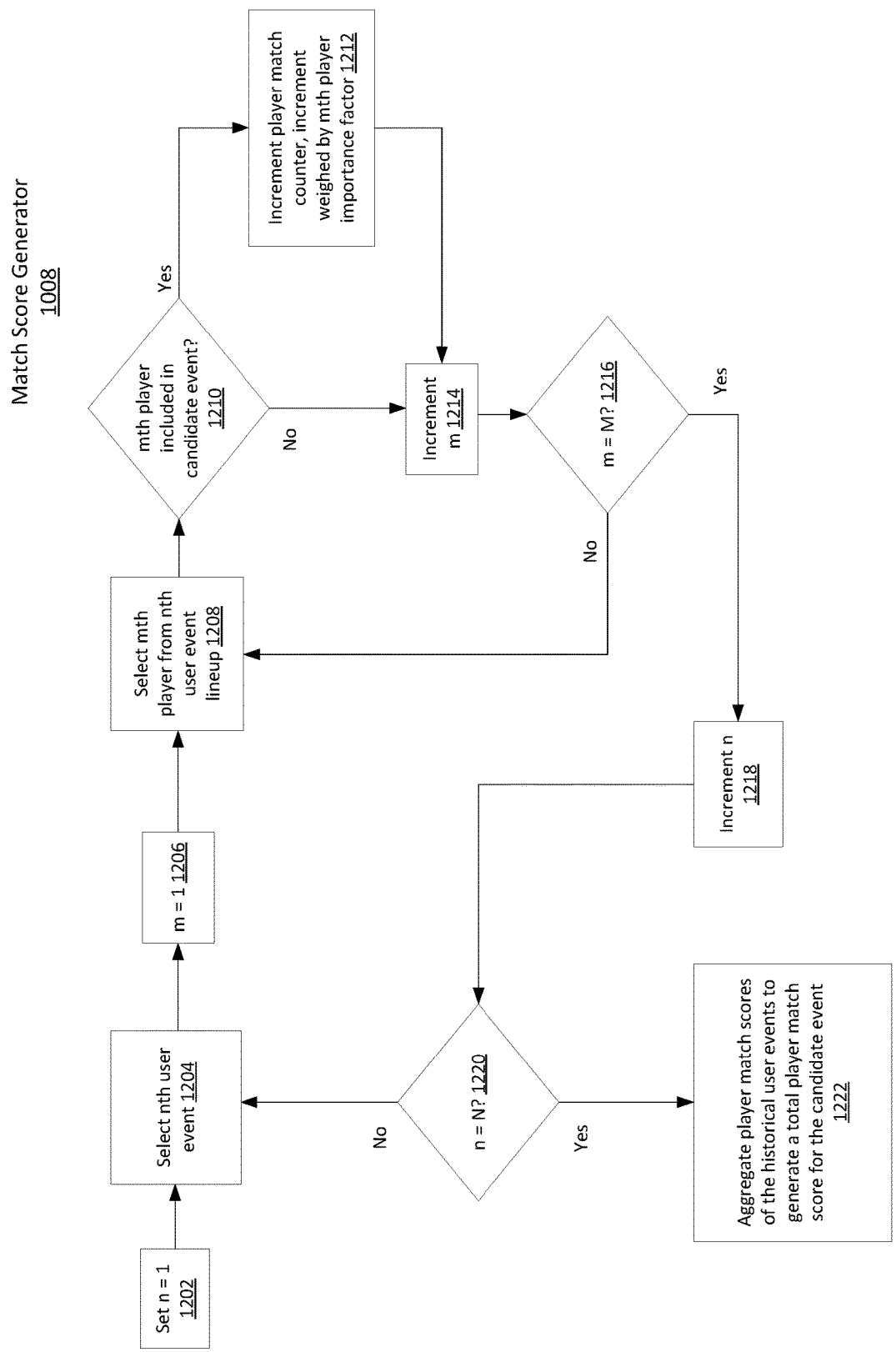
FIG. 12 is a flow chart showing one or more embodiments of a process for determining a player match score for a candidate event.

Referring now to FIG. 12, FIG. 12 is a flow chart showing one or more embodiments of a process for determining a player match score for a candidate event. The process includes operations 1202 through 1222, and can be implemented by the match score generator 1008. The player match score can be a sub-score of a total match score for a candidate event relative to a user profile.

The process can include the following operations. The match score generator 1008 can set an index "n" of historical user events included in a user profile to 1 (or some other initial value) (BLOCK 1202). The match score generator 1008 can select the nth historical user event (BLOCK 1204). The match score generator 1008 can set an index "m" of players included in a lineup of the nth historical user event to 1 (or some other initial value) (BLOCK 1206). The match score generator 1008 can select the mth player of the lineup (BLOCK 1204).

The match score generator 1008 can determine whether the mth player is included in the candidate event (BLOCK 1210). If the mth player is included in the candidate event, the process proceeds to BLOCK 1212, and the match score generator 1008 can increment a player match counter. The player match counter can be incremented by a weighted amount. For example, the player match counter can be incremented by an amount weighted by a player importance factor. The player importance factor may be a predetermined factor, or may be based on information included in the nth historical user event (e.g. may be based on a draft position for the mth player in the nth historical user event, wherein an earlier draft position may correspond to a heavier weight than a later draft position). This may provide for more heavily weighing matches between an important player included in both the nth historical user event and the candidate event. The process can then proceed to BLOCK 1214. Referring back to BLOCK 1210, if the mth player is not included in the candidate event, the process proceeds directly to BLOCK 1214.

The match score generator 1008 can increment the index m (BLOCK 1214). The match score generator 1008 can determine whether m is equal to a total number of players in the lineup M (BLOCK 1216). If m is not equal to the total number of players in the lineup M, the process proceeds to BLOCK 1208. Otherwise, the process proceeds to BLOCK 1218. The match score generator 1008 can increment the index n (BLOCK 1218).

The match score generator 1008 can determine whether the index n equals a total number of user historical events N (BLOCK 1220). If the index n does not equal the total number of user historical events N, the process proceeds to BLOCK 1204. Otherwise, the process proceeds to block 1222, and the match score generator 1008 can aggregate the player match scores for the N historical user events to generate a total player match score for the candidate event. This total player match score can be used by the match score generator 1008 as a sub-score for a total match score between the user profile and the candidate event.

Figure 13:
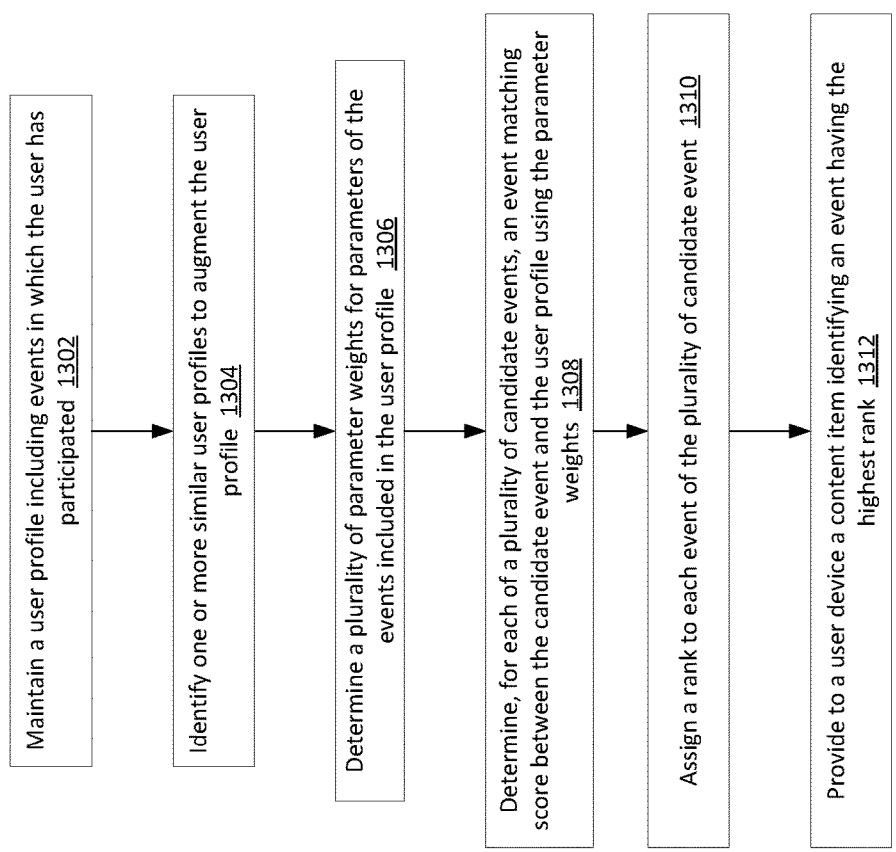
FIG. 13 is a flow chart showing one or more embodiments of a process for prioritizing candidate events.

Referring now to FIG. 13, FIG. 13 is a flow chart depicting a process for prioritizing candidate events. The process can be implemented by the event recommendation system 1002, and can include operations 1302 through 1312. The process can include the following operations.

In a brief overview, the event recommendation system 1002 can maintain a user profile including events in which the user has participated (BLOCK 1302). The event recommendation system 1002 can further identify one or more user profiles similar to the maintained user profile to augment the maintained user profile (BLOCK 1304). The event recommendation system 1002 can further determine a plurality of parameter weights for parameters of the events included in the user profile (BLOCK 1306).

The event recommendation system 1002 can determine, for each of a plurality of candidate events, an event matching score between the candidate event and the user profile using the parameter weights (BLOCK 1308). The event recommendation system 1002 can further assign a rank to each event of the plurality of candidate events based on respective matching scores (BLOCK 1310). The event recommendation system 1002 can further provide to a user device a content item identifying an event having the highest rank (BLOCK 1312).

At BLOCK 1302, the event recommendation system 1002 can maintain a user profile including one or more events in which the user has participated. The event recommendation system 1002 can store historical data for the one or more events, and can update the historical data for the one or more events. This can include storing one or more parameters for the one or more events (e.g. event-generating parameters, context parameters, and/or player or lineup data).

At BLOCK 1304, the event recommendation system 1002 can identify one or more user profiles similar to the maintained user profile to augment the maintained user profile. The user profile augmenter 1006 can augment the user profile by categorizing the user profile as belonging to a set of similar user profiles, and determining statistics based on an expanded set of parameter values that corresponds to the set of similar user profiles. For example, the user profile augmenter 1006 can implement a clustering algorithm on a set of user profiles to generate clusters of similar user profiles. The user profile may be so-clustered, and may be tagged as belonging to a particular set of similar users. The user profile manager 1004 may determine statistics for the particular set of similar users, and may assign those statistics to the user profile. For example, the user profile manager 1004 can perform any of the operations described herein using historical events (and associated information) included in any of the user profiles of the particular set of similar user profiles. The user profile manager 1004 may weigh the user profile more heavily than other user profiles when determining the statistics. This can provide for an augmented user profile.

The user profile augmenter 1006 can augment the user profile by performing operations that include determining expanded statistics related to a set of parameter values for the user profile, or categorizing the user profile as belonging to a set of similar user profiles, and determining statistical features based on an expanded set of parameter values that corresponds to the set of similar user profiles. The user profile augmenter 1006 can augment the user profile by determining expanded statistical features related to a set of parameter values for the user profile. For example, the user profile augmenter 1006 can infer or predict a statistical feature for the user profile based on similar user profiles. In some embodiments, this is implemented using collaborative filtering. An example of such collaborative filtering is described herein with respect to FIG. 11.

At BLOCK 1306, the event recommendation system 1002 can further determine a plurality of parameter weights for parameters of the events included in the user profile, and at BLOCK 1308, the event recommendation system 1002 can determine, for each of a plurality of candidate events, an event matching score between the candidate event and the augmented user profile using the parameter weights. The match score generator 1008 can determine a total event match score for a candidate active event. The total event match score can be an aggregation of sub-scores. The sub-scores can include, for example, a player match score (e.g. a score that corresponds to matching between one or more players included in, or otherwise associated with, the user profile and one or more players included in, or otherwise associated with, the candidate active event), a team-match score (e.g. a score that corresponds to matching between one or more teams included in, or otherwise associated with, the user profile and one or more teams included in, or otherwise associated with, the candidate active event), or a match score for any parameter described herein. The match score generator 1008 can determine weights for event parameters, and the match score may be a weighted count of matching parameter values between the user profile and the candidate event using the generated weights. Thus, the match score generator 1008 can determine one or more sub-scores, and can aggregate the sub-scores to determine a total match score for the candidate event relative to the user profile.

In some embodiments, the match score generator 1008 can determine an under-saturation score for the candidate event. The under-saturation score can be based on an under-saturation count or under-saturation value determined by the pace tracker 312 (e.g. using the method shown in FIG. 8B). In some embodiments, the under-saturation score can be a sub-score that is aggregated with other sub-scores by the match score generator 1008 to determine the total match score for the candidate event relative to the user profile.

At BLOCK 1310, the event recommendation system 1002 can further assign a rank to each event of the plurality of event based on respective matching scores. The match score generator 1008 may rank each event of the set of candidate events in descending order from highest match score to lowest match score. In some embodiments, the match score generator 1008 may determine a set of candidate events (e.g. all of the candidate events, or a smaller set of candidate events that satisfy one or more predetermined conditions (such as having a match score above a predetermined threshold)), and the match score generator 1008 may rank the set of candidate events based on the under-saturation score. For example, the match score generator 1008 may rank the candidate events of the set of candidate events in descending order form highest under-saturation score to lowest under-saturation score, or may employ any other appropriate ranking policy.

At BLOCK 1312, the event recommendation system 1002 can further provide to a user device a content item identifying an event having the highest rank. The content item can include a reference to one or more events that have a match score that satisfies a predetermined condition to a user profile associated with the client device. Such events may be referred to herein as "similar" events. For example, the content item provider 1010 can provide data for displaying or rendering the content item, or can instruct another system to provide such data. In some embodiments, the content item can be displayed with reference to a lobby 202 provided to the client device, and the content item provider 1010 can determine to include similar events in the lobby 202 (e.g. the similar events can be shown in a predetermined location in a user interface displaying the lobby 202).

The content item can include a reference to (e.g. can include a reference included in a text, an image, a video, a hyperlink, an interactive object for initializing an application, or another media item) the similar event. The reference may have one or more features. The features can include, for example, a stylistic feature (e.g. a particular text style (which can specify a size, a font, underlining, bold, italics, or another style, and in some embodiments the style can be different than another style used in the media item)), a predetermined location in the media item or a location defined relative to another object of the media item, a visual indicator associated with the reference to the similar event (e.g. a box, circle, or other visual indicator that surrounds or is otherwise positioned relative to the reference), or any other appropriate feature. The content item provider 1010 can provide data for displaying or rendering such a content item.

Figure 14:
FIG. 14 depicts one or more embodiments of a content item including a recommendation to register in a particular recommended event.

Referring now to FIG. 14, FIG. 14 depicts a content item 1402. Similar to the content item 908 shown in FIG. 9C, the content item 1402 can be displayed on a client device, and data for displaying, rendering, or otherwise providing the content item 1402 can be transmitted by the event management system 206. The content item 1402 can include an identification of a similar contents 1404 (an event similar to historical user events associated with the client device), and can include a registration object 1406. Similar to the registration object 912, the registration object 1406 can include an object that the user can interact with to facilitate registration in the similar event 1404. For example, the registration object 1406 can include a user-selectable hyperlink that initiates a process to download a webpage, or initiate a process of an application, for registering for the similar event 1404.

It should be appreciated that although the specification and claims refer to fantasy sports, the application is not limited to fantasy sports. Rather, the scope of the application may extend to other contexts where a content management server maintains a dynamic set of resources that can be monitored for projected utilization and actions can be taken based on the projected utilization, including the generation or allocation of new resources or actions that cause traffic to be directed to one or more resources of the existing set of resources.

The invention claimed is:

1. A method for prioritization of computer executable events based on dynamically changing entity data, comprising:

maintaining, by an event management system including one or more processors, for each first event of a plurality of first events managed by the event management system, historical registration data, the historical registration data identifying, for each time of a plurality of times, a number of entities at the time, each first event including respective parameter values of one or more parameters used to generate the first event;

identifying, by the event management system, for a second event that has an open registration status, respective parameter values of one or more parameters used to generate the second event and registration data identifying, for each time of a plurality of times since registration for the second event was opened, a current number of entities at the time;

computing, by a similarity score generator of the event management system, a similarity score between the second event and each first event of the plurality of first events, the similarity score computed using i) the identified respective parameter values used to generate the second event and generate the first event and ii) the identified registration data of the second event and iii) the historical registration data of the first event;

selecting, by the similarity score generator, for the second event, a subset of the plurality of first events based on the similarity score for each of the events of the subset exceeding a threshold similarity score value;

generating, by an entity projector of the event management system, for the second event, a projected number of entities based on i) the registration data of the second event and ii) the historical registration data of one or more first events included in the selected subset;

determining a ranking of the second event relative to one or more third events that have an open registration status;

determining, by the event management system, a presentation layout based on the determined ranking of the second event relative to one or more third events; and providing, by the event management system, for display, the presentation layout.

2. The method of claim 1, further comprising determining, by an event generator of the event management system, a time at which to generate a fourth event based on the projected number of entities; and generating, by the event generator of the event management system, the fourth event at the determined time.

3. The method of claim 2, wherein determining the time at which to generate the fourth event is performed based on a policy for generating new events, wherein the policy comprises a schedule for generating new events including candidate times for generating a new event.

4. The method of claim 3, wherein the policy comprises a sub-policy of requesting, at one of the candidate times for generating the new event, from a pace tracker of the event management system, whether one or more events is under-saturated, and responsive to determining that the one or more events is under-saturated, restricting generating a new event at the one of the candidate times for generating a new event.

5. The method of claim 1, wherein computing the similarity score between the second events and each of the first events comprises calculating, for each of the first events, a similarity score for each of one or more parameters common to the first event and the second event, and aggregating the similarity scores to generate a total similarity score for the first event and the second event.

6. The method of claim 5, wherein aggregating the similarity scores comprises performing a weighted sum using pre-determined weights corresponding to the one or more parameters common to the first event and the second event.

7. The method of claim 1, wherein generating, for the second event, a projected number of entities comprises generating one or more entity profile parameters for the second event.

8. The method of claim 7, wherein generating the one or more entity profile parameters for the second event comprises aggregating a corresponding respective parameter value for the first events using pre-determined weights.

9. The method of claim 1, wherein the second event and each first event includes one or more context parameters and corresponding context parameter values, and the similarity score is further computed using the context parameter values of the second event and of each first event.

10. The method of claim 9, wherein the one or more context parameters comprise a number of open events at close of registration.

11. The method of claim 9, wherein the one or more context parameters comprise a number of similar open events at close of registration.

12. The method of claim 1, further comprising identifying, by the event management system, for the second event, respective parameter values for one or more entity profile parameters, wherein each of the first events includes respective parameter values for one or more entity profile parameters, and wherein the similarity score is computer further using the respective parameter values for the one or more entity profile parameters of the first events and the second event.

13. The method of claim 1, further comprising:
determining, by the event management system, positions for different events within the layout for the event display based on the determined ranking; and
displaying, by the event management system, events within the layout for the event display based on the determined positions.

14. A system for prioritization of computer executable events based on dynamically changing entity data, comprising:
one or more processors; and
memory comprising:
historical registration data for each first event of a plurality of first events, the historical registration data identifying, for each time of a plurality of times, a number of entities at the time, each first event including respective parameter values of one or more parameters used to generate the first event; and
computer-readable instructions stored in memory that, when executed by the one or more processors, cause the one or more processors to:
identify, for a second event that has an open registration status, respective parameter values of one or more parameters used to generate the second event and registration data identifying, for each time of a plurality of times since registration for the second event was opened, a current number of entities at the time;
compute, a similarity score between the second event and each first event of the plurality of first events, the similarity score computed using i) the identified respective parameter values used to generate the second event and generate the first event and ii) the identified registration data of the second event and the historical registration data of the first event;
select, for the second event, a subset of the plurality of first events based on the similarity score for each of the events of the subset exceeding a threshold similarity score value;
generate, for the second event, a projected number of entities based on i) the registration data of the second event and ii) the historical registration data of one or more first events included in the selected subset; and
determine a ranking of the second event relative to one or more third events that have an open registration status.

15. The system of claim 14, wherein the computer-readable instructions, when executed by the processor, further cause the one or more processors to:
determine a presentation layout based on the determined ranking of the second event relative to one or more third events; and
provide, for display, the presentation layout.

16. The system of claim 14, wherein the computer-readable instructions, when executed by the processor, further cause the one or more processors to:
calculate, for each of the first events, a similarity score for each of one or more parameters common to the first event and the second event, and aggregating the similarity scores to generate a total similarity score for the first event and the second event.

17. The system of claim 16, wherein the computer-readable instructions, when executed by the processor, further cause the processor to:
aggregate the similarity scores comprises by performing a weighted sum using predetermined weights corresponding to the one or more parameters common to the first event and the second event.

18. The system of claim 14, wherein the computer-readable instructions, when executed by the processor, further cause the one or more processors to:
generate, for the second event, a projected number of entities comprises generating one or more entity profile parameters for the second event.

19. The system of claim 18, wherein the computer-readable instructions, when executed by the processor, further cause the one or more processors to:
generate the one or more entity profile parameters for the second event comprises aggregating a corresponding respective parameter value for the first events using pre-determined weights.

20. The system of claim 14, wherein the computer-readable instructions, when executed by the processor, further cause the one or more processors to:
identify, by the event management system, for the second event, respective parameter values for one or more entity profile parameters, wherein each of the first events includes respective parameter values for one or more entity profile parameters, and wherein the similarity score is computer further using the respective parameter values for the one or more entity profile parameters of the first events and the second event.

* * * * *